US007809776B1

(12) United States Patent
Witte et al.

(10) Patent No.: US 7,809,776 B1
(45) Date of Patent: Oct. 5, 2010

(54) SYSTEM AND METHOD FOR SUPPORTING CHANGE NOTIFY WATCHES FOR VIRTUALIZED STORAGE SYSTEMS

(75) Inventors: Wesley R. Witte, Campbell, CA (US); Amol D. Dixit, Cambridge, MA (US)

(73) Assignee: NetApp, Inc., Sunnyvale, CA (US)

(*) Notice: Subject to any disclaimer, the term of this patent is extended or adjusted under 35 U.S.C. 154(b) by 339 days.

(21) Appl. No.: 11/948,608

(22) Filed: Nov. 30, 2007

(51) Int. Cl.
*G06F 17/30* (2006.01)
(52) U.S. Cl. ........................................ 707/825
(58) Field of Classification Search ............ 707/1, 707/4, 206, 825; 709/214
See application file for complete search history.

(56) References Cited

U.S. PATENT DOCUMENTS

| | | | |
|---|---|---|---|
| 5,819,292 A | 10/1998 | Hitz et al. | |
| 5,944,789 A * | 8/1999 | Tzelnic et al. | 709/214 |
| 6,671,773 B2 | 12/2003 | Kazar et al. | |
| 2002/0116593 A1 | 8/2002 | Kazar et al. | |
| 2003/0065796 A1* | 4/2003 | Borr | 709/229 |
| 2005/0246401 A1 | 11/2005 | Edwards et al. | |
| 2006/0218135 A1* | 9/2006 | Bisson et al. | 707/4 |
| 2006/0288026 A1 | 12/2006 | Zayas et al. | |
| 2008/0243967 A1* | 10/2008 | Bhatia et al. | 707/206 |

OTHER PUBLICATIONS

U.S. Appl. No. 11/264,831, entitled System and Method for Managing Hard Lock State Information in a Distributed Storage System Environment, filed Nov. 1, 2005, 54 pages.

* cited by examiner

*Primary Examiner*—Etienne P LeRoux
(74) *Attorney, Agent, or Firm*—Cesari and McKenna, LLP

(57) ABSTRACT

A technique supports Change Notify watches in virtualized storage systems. In particular, techniques of the present invention advantageously emulate Change Notify features (e.g., as documented by the CIFS protocol) on virtualized storage systems by leveraging virtualization mapping information (e.g., an inode-to-path or "I2P" mapping) to walk a file system tree backwards from the data blocks to their ancestors to determine whether there are applicable watches on ancestor directories, and to obtain a pathname (e.g., relative) of the watched (changed) data. In particular, changes to data received from different protocols (e.g., CIFS, NFS, HTTP, etc.) can trigger watches to clients on the virtualized storage system. Also, performance may be enhanced using various caching techniques, and watch state may be retained while moving watched data across volumes of the virtualized storage system.

21 Claims, 30 Drawing Sheets

WATCH_INODE_CACHE STRUCTURE  2200

DIRECTORY_GENERATION FIELD
2205

INHERITED_GENERATION FIELD
2210

MODE_GENERATION FIELD
2215

POST_GENERATION FIELD
2220

POST_ACTION_MASK FIELD
2225

MODE_SUMMARY FIELD
2230

PATH_POINTER FIELD
2235

FIG. 22

SYSTEM AND METHOD FOR SUPPORTING CHANGE NOTIFY WATCHES FOR VIRTUALIZED STORAGE SYSTEMS

FIELD OF THE INVENTION

The present invention relates to storage systems and, in particular, to supporting Change Notify watches in virtualized storage systems.

BACKGROUND OF THE INVENTION

A storage system typically comprises one or more storage devices into which information may be entered, and from which information may be obtained, as desired. The storage system includes a storage operating system that functionally organizes the system by, inter alia, invoking storage operations in support of a storage service implemented by the system. The storage system may be implemented in accordance with a variety of storage architectures including, but not limited to, a network-attached storage (NAS) environment, a storage area network (SAN), and a disk assembly directly attached to a client or host computer. The storage devices are typically disk drives organized as a disk array, wherein the term "disk" commonly describes a self-contained rotating magnetic media storage device. The term disk in this context is synonymous with hard disk drive (HDD) or direct access storage device (DASD).

The storage operating system of the storage system may implement a high-level module, such as a file system, to logically organize the information stored on volumes as a hierarchical structure of data containers, such as files and logical units. For example, each "on-disk" file may be implemented as set of data structures, i.e., disk blocks, configured to store information, such as the actual data for the file. These data blocks are organized within a volume block number (vbn) space that is maintained by the file system. The file system may also assign each data block in the file a corresponding "file offset" or file block number (fbn). The file system typically assigns sequences of fbns on a per-file basis, whereas vbns are assigned over a larger volume address space. The file system organizes the data blocks within the vbn space as a "logical volume"; each logical volume may be, although is not necessarily, associated with its own file system.

A known type of file system is a write-anywhere file system that does not overwrite data on disks. If a data block is retrieved (read) from disk into a memory of the storage system and "dirtied" (i.e., updated or modified) with new data, the data block is thereafter stored (written) to a new location on disk to optimize write performance. A write-anywhere file system may initially assume an optimal layout such that the data is substantially contiguously arranged on disks. The optimal disk layout results in efficient access operations, particularly for sequential read operations, directed to the disks. An example of a write-anywhere file system that is configured to operate on a storage system is the Write Anywhere File Layout (WAFL®) file system available from Network Appliance, Inc., Sunnyvale, Calif.

The storage system may be further configured to operate according to a client/server model of information delivery to thereby allow many clients to access data containers stored on the system. In this model, the client may comprise an application, such as a database application, executing on a computer that "connects" to the storage system over a computer network, such as a point-to-point link, shared local area network (LAN), wide area network (WAN), or virtual private network (VPN) implemented over a public network such as the Internet. Each client may request the services of the storage system by issuing file-based and block-based protocol messages (in the form of packets) to the system over the network. By supporting a plurality of file system protocols, such as the conventional Common Internet File System (CIFS) and the Network File System (NFS) protocols, the utility of the storage system is enhanced.

Often, it is desirable for a client (or administrator) to be aware of changes to the data containers served by the storage system. Typically, changes to data containers are maintained through the client's operating system, which locally manages storage and is thus aware of file and directory locations in that local storage. Two problems arise, however, with virtualized network storage systems, such as the logical volumes served by the storage system described above. First, the client's local operating system is generally unaware of the actual physical storage locations of the files and directories on the logical volumes of the storage system, and as such, is generally unable to monitor for changes, particularly those made by clients sharing the logical volumes. Second, the logical volumes, generally, are minimally "aware" of the files and directories at the data block level. In other words, the portions of the logical volumes that control the underlying physical storage (e.g., in a clustered storage system, as described herein) are only aware that data has changed, not to which particular files or directories that data belongs (e.g., handled by another portion of a clustered storage system).

SUMMARY OF THE INVENTION

The present invention overcomes the disadvantages of the prior art by providing a system and method for supporting Change Notify watches in virtualized storage systems. In particular, techniques of the present invention advantageously emulate Change Notify features (e.g., as documented by the CIFS protocol) on virtualized storage systems by leveraging virtualization mapping information (e.g., an inode-to-path or "I2P" mapping) to "walk" a file system tree backwards from the data blocks to their higher-level file and directory inodes ("ancestors") to determine whether there are applicable watches on ancestor directories, and to obtain a pathname (e.g., relative) of the watched (changed) data. In particular, changes to data received from different protocols (e.g., CIFS, NFS, HTTP, etc.) can trigger watches to clients on the virtualized storage system. Also, performance may be enhanced using various caching techniques, and watch state may be retained while moving watched data across volumes of the virtualized storage system.

According to one or more embodiments of the present invention, data is stored on data containers of a storage system that may be arranged as one or more logical volumes (e.g., a clustered storage system), and a mapping is maintained from the data containers to corresponding parent directories of a file system of the storage system (e.g., I2P mapping). Watches may be set (e.g., by clients) on one or more of the directories to request that changes made to data stored within the directories be reported in accordance with Change Notify features. In the event a change is detected to data stored within a directory upon which a watch is set, the mapping is traversed to determine a relative pathname of the changed data based on the corresponding parent directories, and the pathname is reported (e.g., to the client). If the watches define an action to be taken in response to changes, then the system also takes that action, such as performing a "delete-pending" procedure, etc.

Also, according to an aspect of the present invention, triggered watch events may be cached. Such caching may increase performance and reduce storage requirements. For instance, caching may be used to prevent duplicate reports, and to prevent traversal of the mapping based on previously stored pathnames.

Further, according to another aspect of the present invention, the logical volumes may be moved from a first storage device to a second storage device (e.g., of a clustered storage system). As such, the present invention defines techniques that may be used to retain the watches during the move to the second storage device.

BRIEF DESCRIPTION OF THE DRAWINGS

The above and further advantages of invention may be better understood by referis ring to the following description in conjunction with the accompanying drawings in which like reference numerals indicate identical or functionally similar elements:

FIG. 22 is an illustrative block diagram of an example Watch_Inode_Cache Structure in accordance with the present invention;

DETAILED DESCRIPTION OF AN ILLUSTRATIVE EMBODIMENT

As noted, it is often desirable for a client (or administrator) to be aware of changes to the data containers served by the storage system. "Change Notify" is a facility in CIFS network filesystems that notifies clients of any changes made to directories or files of the storage system, e.g., at a single directory level or an entire subtree level. The client identifies the directories and actions it wants reported by setting "watches" on these directories. When changes are made to a file or directory having an associated watch (as requested by the client), the watch is triggered, and a response is sent to notify the client of the change. (For example, these changes may be conveyed to the client through an NT_TRANSACT_NOTIFY_CHANGE command of a conventional Server Message Block (SMB) NT Trans Request, as may be appreciated by those skilled in the art.) For the reasons described above, however, it has been difficult to support Change Notify watches on virtualized storage systems Accordingly, the present invention provides a system and method for supporting Change Notify watches in virtualized storage systems. In particular, techniques of the present invention advantageously emulate Change Notify features (e.g., as documented by the CIFS protocol, Common Internet File System (CIFS) Version: CIFS-Spec 0.9, Storage Networking Industry Association (SNIA), Draft SNIA CIFS Documentation Work Group Work-in-Progress, Revision Date: Mar. 26, 2001) on virtualized storage systems by leveraging virtualization mapping information (e.g., an inode-to-path or "I2P" mapping) to walk a file system tree backwards from the data blocks to their ancestors to determine whether there are applicable watches on ancestor directories, and to obtain a pathname of the watched (changed) data. In particular, changes to data received from different protocols (e.g., CIFS, NFS, HTTP, etc.) can trigger watches to clients on the virtualized storage system. Also, performance may be enhanced using various caching techniques, and watch state may be retained while moving watched data across volumes of the virtualized storage system.

A. Cluster Environment

Figure 1:
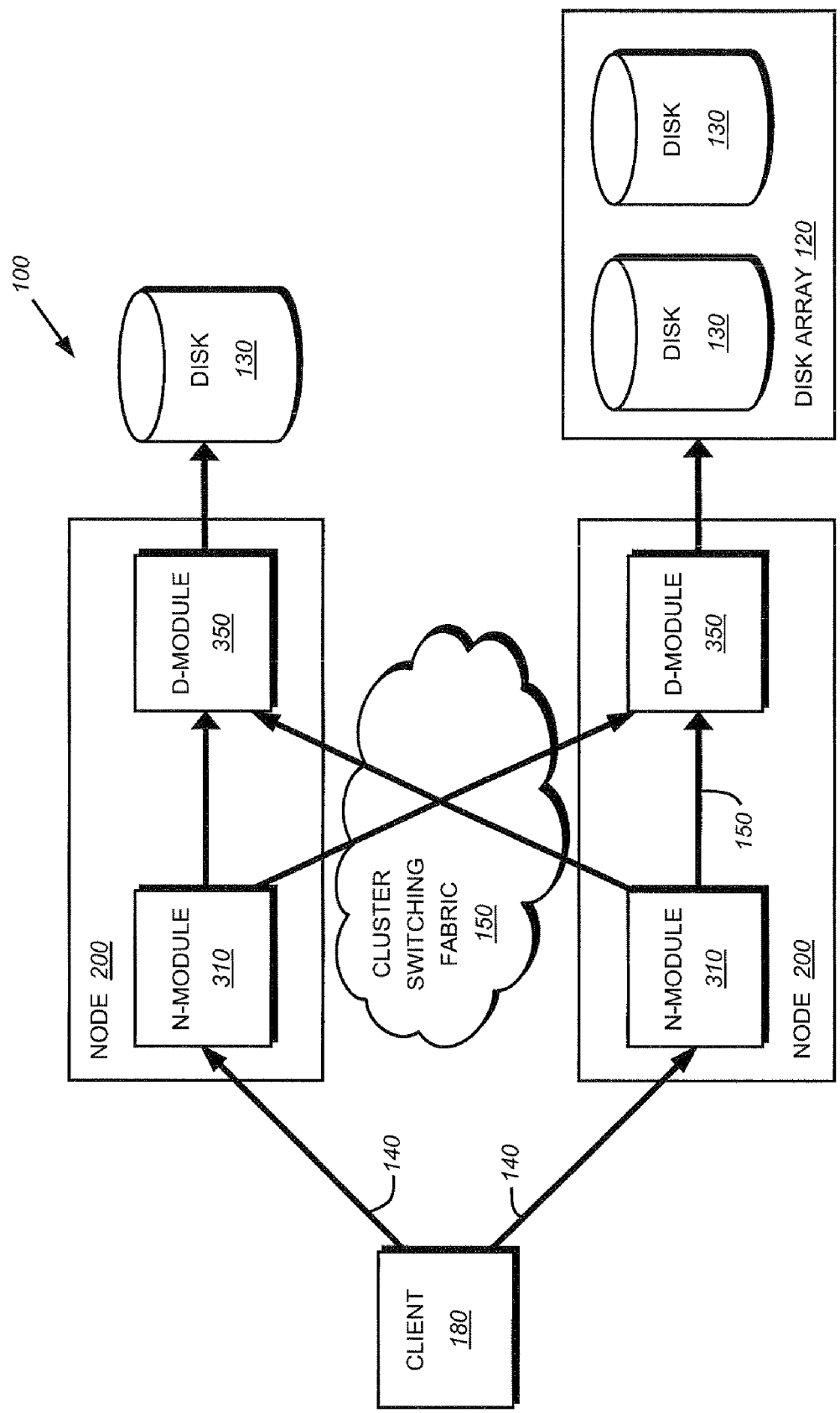
FIG. 1 is a schematic block diagram of a plurality of nodes interconnected as a cluster in accordance with an embodiment of the present invention.

FIG. 1 is a schematic block diagram of a plurality of nodes 200 interconnected as a cluster 100 and configured to provide storage service relating to the organization of information on storage devices. The nodes 200 comprise various functional components that cooperate to provide a distributed storage system architecture of the cluster 100. To that end, each node 200 is generally organized as a network element (N-module 310) and a disk element (D-module 350) (or storage element). The N-module 310 includes functionality that enables the node 200 to connect to clients 180 over a computer network 140, while each D-module 350 connects to one or more storage devices, such as disks 130 of a disk array 120. The nodes 200 are interconnected by a cluster switching fabric 150 which, in the illustrative embodiment, may be embodied as a Gigabit Ethernet switch. An exemplary distributed file system architecture is generally described in U.S. Pat. No. 6,671,773 titled METHOD AND SYSTEM FOR RESPONDING TO FILE SYSTEM REQUESTS, by M. Kazar, et al. issued on Dec. 30, 2003. It should be noted that while there is shown an equal number of N and D-modules in the illustrative cluster 100, there may be differing numbers of N and/or D-modules in accordance with various embodiments of the present invention. For example, there may be a plurality of N-modules and/or D-modules interconnected in a cluster configuration 100 that does not reflect a one-to-one correspondence between the N and D-modules. As such, the description of a node 200 comprising one N-module and one D-module should be taken as illustrative only.

The clients 180 may be general-purpose computers configured to interact with the node 200 in accordance with a client/server model of information delivery. That is, each client may request the services of the node, and the node may return the results of the services requested by the client, by exchanging packets over the network 140. The client may issue packets including file-based access protocols, such as the Common Internet File System (CIFS) protocol or Network File System (NFS) protocol, over the Transmission Control Protocol/Internet Protocol (TCP/IP) when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks. Notably, the clients may request that one or more watches be set on data stored by the storage system, such as in accordance with a Change Notify feature, as described herein.

B. Storage System Node

Figure 2:
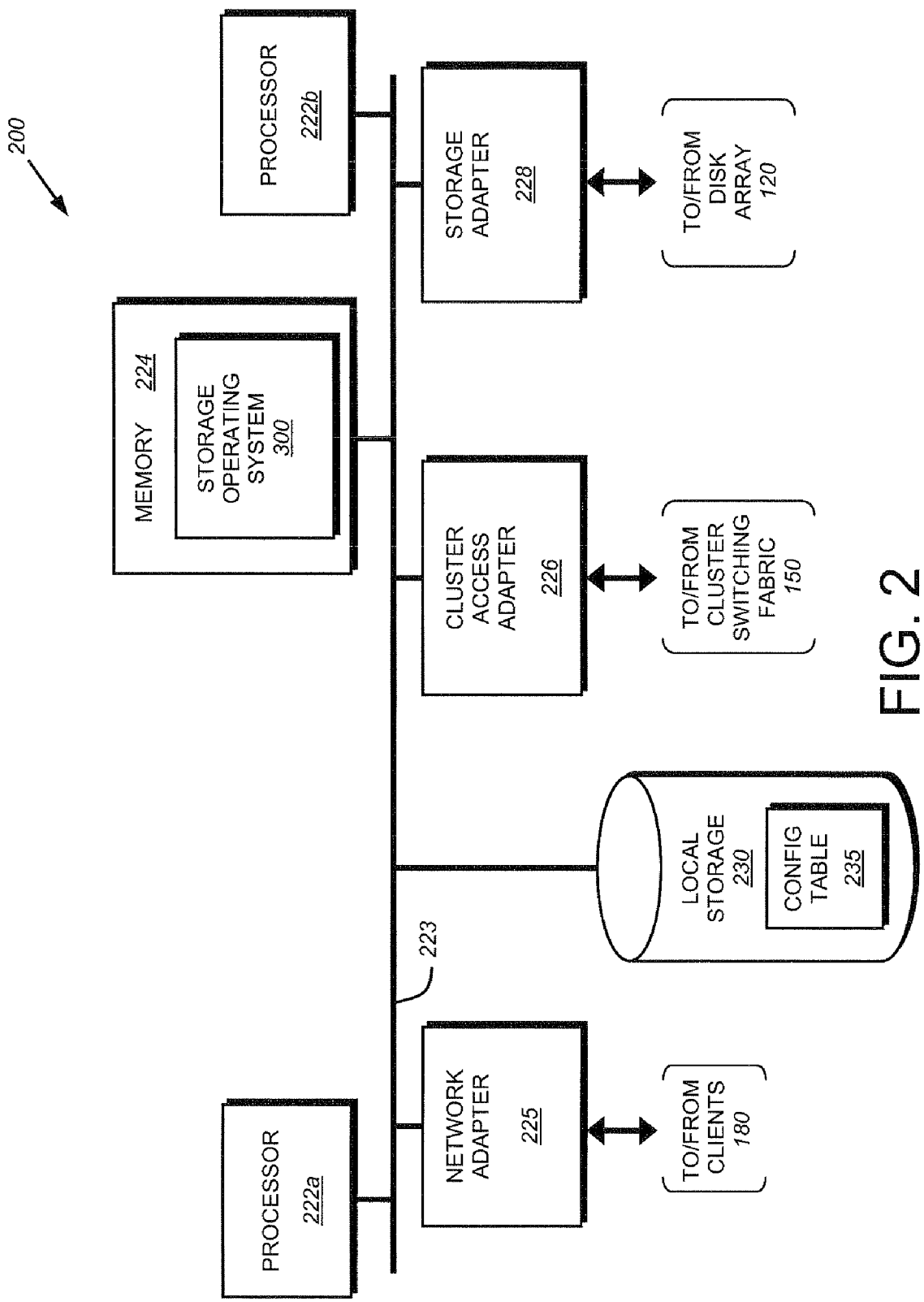
FIG. 2 is a schematic block diagram of a node in accordance with an embodiment of the present invention.

FIG. 2 is a schematic block diagram of a node 200 that is illustratively embodied as a storage system comprising a plurality of processors 222a,b, a memory 224, a network adapter 225, a cluster access adapter 226, a storage adapter 228, and local storage 230 interconnected by a system bus 223. The local storage 230 comprises one or more storage devices, such as disks, utilized by the node to locally store configuration information (e.g., in configuration table 235) provided by one or more management processes that execute as user inode applications 1100 (see FIG. 11). The cluster access adapter 226 comprises a plurality of ports adapted to couple the node 200 to other nodes of the cluster 100. In the illustrative embodiment, Ethernet is used as the clustering protocol and interconnect media, although it will be apparent to those skilled in the art that other types of protocols and interconnects may be utilized within the cluster architecture described herein. In alternate embodiments where the N-modules and D-modules are implemented on separate storage systems or computers, the cluster access adapter 226 is utilized by the N/D-module for communicating with other N/D-modules in the cluster 100.

Each node 200 is illustratively embodied as a dual processor storage system executing a storage operating system 300 that preferably implements a high-level module, such as a file system, to logically organize the information as a hierarchical structure of named data containers, such as directories, files, and special types of files called virtual disks (hereinafter generally "blocks") on the disks. However, it will be apparent to those of ordinary skill in the art that the node 200 may alternatively comprise a single or more than two processor system. Illustratively, one processor 222a executes the functions of the N-module 310 on the node, while the other processor 222b executes the functions of the D-module 350.

The memory 224 illustratively comprises storage locations that are addressable by the processors and adapters for storing software program code and data structures associated with the present invention. The processor and adapters may, in turn, comprise processing elements and/or logic circuitry configured to execute the software code and manipulate the data structures. The storage operating system 300, portions of which is typically resident in memory and executed by the processing elements, functionally organizes the node 200 by, inter alia, invoking storage operations in support of the storage service implemented by the node. It will be apparent to those skilled in the art that other processing and memory means, including various computer readable media, may be used for storing and executing program instructions pertaining to the invention described herein.

The network adapter 225 comprises a plurality of ports adapted to couple the node 200 to one or more clients 180 over point-to-point links, wide area networks, virtual private networks implemented over a public network (Internet), or a shared local area network. The network adapter 225 thus may comprise the mechanical, electrical, and signaling circuitry needed to connect the node to the network. Illustratively, the computer network 140 may be embodied as an Ethernet network or a Fibre Channel (FC) network. Each client 180 may communicate with the node over network 140 by exchanging discrete frames or packets of data according to pre-defined protocols, such as TCP/IP.

The storage adapter 228 cooperates with the storage operating system 300 executing on the node 200 to access information requested by the clients. The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on the disks 130 of array 120. The storage adapter comprises a plurality of ports having input/output (I/O) interface circuitry that couples to the disks over an I/O interconnect arrangement, such as a conventional high-performance, FC link topology.

Storage of information on each array 120 is preferably implemented as one or more storage "volumes" that comprise a collection of physical storage disks 130 cooperating to define an overall logical arrangement of volume block number (vbn) space on the volume(s). Each logical volume is generally, although not necessarily, associated with its own file system. The disks within a logical volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the inventive principles described herein.

C. Storage Operating System

To facilitate access to the disks 130, the storage operating system 300 illustratively implements a write-anywhere file system that cooperates with one or more virtualization modules to "virtualize" the storage space provided by disks 130. The file system logically organizes the information as a hierarchical structure of named directories and files on the disks. Each "on-disk" file may be implemented as set of disk blocks configured to store information, such as data, whereas the directory may be implemented as a specially formatted file in which names and links to other files and directories are stored. The virtualization module(s) allow the file system to further logically organize information as a hierarchical structure of blocks on the disks that are exported as named logical unit numbers (luns).

In the illustrative embodiment, the storage operating system is preferably the NetApp® Data ONTAP® operating system available from Network Appliance, Inc., Sunnyvale, Calif. that implements a Write Anywhere File Layout (WAFL®) file system. However, it is expressly contemplated that any appropriate storage operating system may be enhanced for use in accordance with the inventive principles described herein. As such, where the term "ONTAP" is employed, it should be taken broadly to refer to any storage operating system that is otherwise adaptable to the teachings of this invention.

Figure 3:
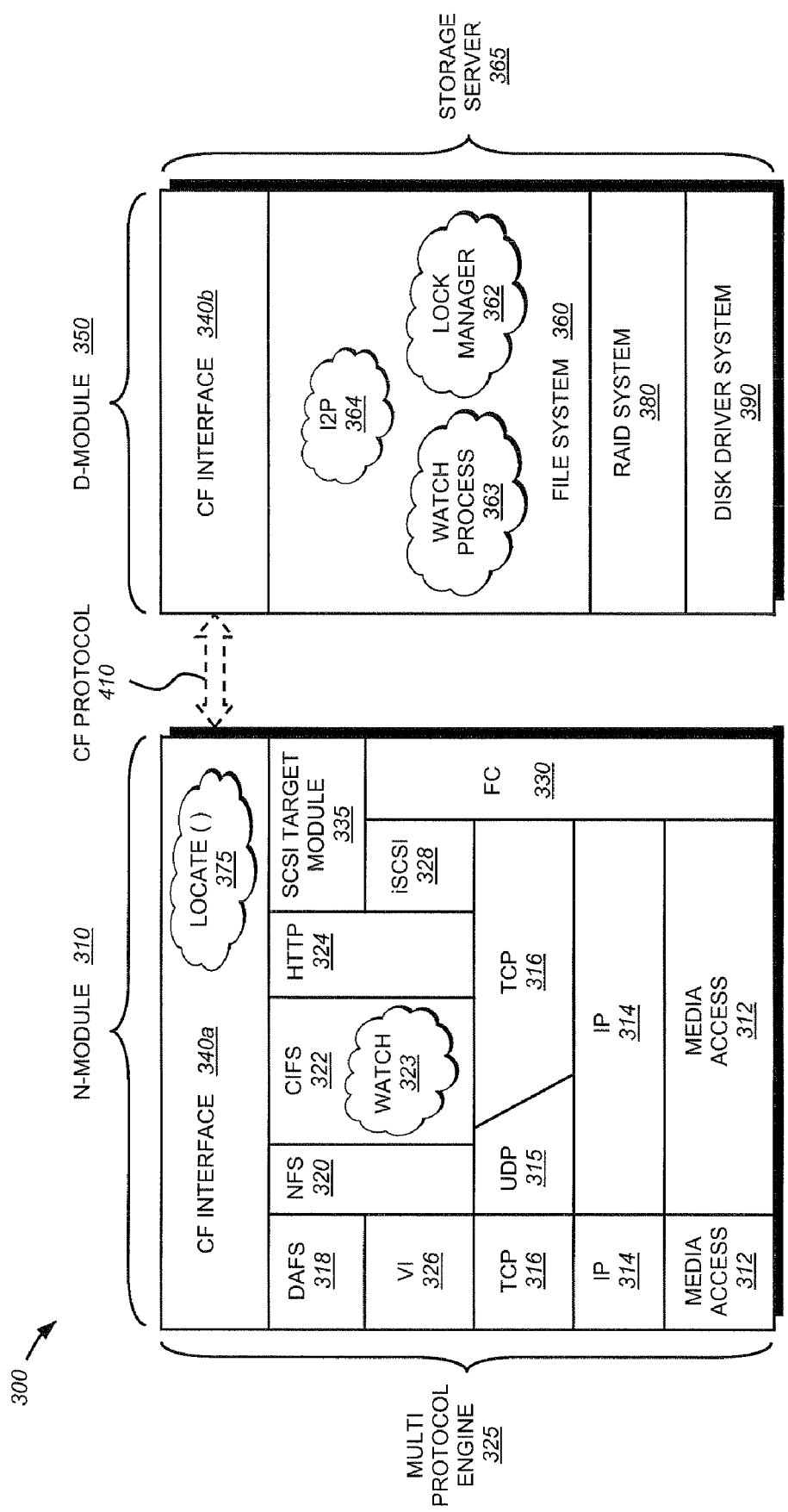
FIG. 3 is a schematic block diagram of a storage operating system that may be advantageously used with the present invention.

FIG. 3 is a schematic block diagram of the storage operating system 300 that may be advantageously used with the present invention. The storage operating system 300 comprises a series of software layers organized to form an integrated network protocol stack or, more generally, a multi-protocol engine 325 that provides data paths for clients to access information stored on the node using block and file access protocols. The multi-protocol engine includes a media access layer 312 of network drivers (e.g., gigabit Ethernet drivers) that interfaces to network protocol layers, such as the IP layer 314 and its supporting transport mechanisms, the TCP layer 316, and the User Datagram Protocol (UDP) layer 315. A file system protocol layer provides multi-protocol file access and, to that end, includes support for the Direct Access File System (DAFS) protocol 318, the NFS protocol 320, the CIFS protocol 322 (e.g., with illustrative watch process 323 in accordance with the present invention), and the Hypertext Transfer Protocol (HTTP) protocol 324. A VI layer 326 implements the VI architecture to provide direct access transport (DAT) capabilities, such as RDMA, as required by the DAFS protocol 318. An iSCSI driver layer 328 provides block protocol access over the TCP/IP network protocol layers, while a FC driver layer 330 receives and transmits block access requests and responses to and from the node. The FC and iSCSI drivers provide FC-specific and iSCSI-specific access control to the blocks and, thus, manage exports of luns to either iSCSI or FCP or, alternatively, to both iSCSI and FCP when accessing the blocks on the node 200.

In addition, the storage operating system 300 includes a series of software layers organized to form a storage server 365 that provides data paths for accessing information stored on the disks 130 of the node 200. To that end, the storage server 365 includes a file system module 360 in cooperating relation with a RAID system module 380 and a disk driver system module 390. The RAID system 380 manages the storage and retrieval of information to and from the volumes/disks in accordance with I/O operations, while the disk driver system 390 implements a disk access protocol such as, e.g., the SCSI protocol. In particular, the VSM 370 implements a Locate( ) function 375 to compute the location of data container content among the volumes served by the cluster to thereby ensure consistency of such content.

The file system 360 implements a virtualization system of the storage operating system 300 through the interaction with one or more virtualization modules illustratively embodied as, e.g., a virtual disk (vdisk) module (not shown) and a SCSI target module 335. The vdisk module enables access by administrative interfaces, such as a user interface of a management framework 1110 (see FIG. 11), in response to a user (system administrator) issuing commands to the node 200. The SCSI target module 335 is generally disposed between the FC and iSCSI drivers 328, 330 and the file system 360 to provide a translation layer of the virtualization system between the block (lun) space and the file system space, where luns are represented as blocks.

The file system 360 is illustratively a message-based system that provides logical volume management capabilities for use in access to the information stored on the storage devices, such as disks. That is, in addition to providing file system semantics, the file system 360 provides functions normally associated with a volume manager. These functions include (i) aggregation of the disks, (ii) aggregation of storage bandwidth of the disks, and (iii) reliability guarantees, such as mirroring and/or parity (RAID). The file system 360 illustratively implements the WAFL file system (hereinafter generally the "write-anywhere file system") having an on-disk format representation that is block-based using, e.g., 4 kilobyte (KB) blocks and using index nodes ("inodes") to identify files and file attributes (such as creation time, access permissions, size and block location). The file system uses files to store meta-data describing the layout of its file system; these meta-data files include, among others, an inode file. A file handle, i.e., an identifier that includes an inode number, is used to retrieve an inode from disk.

Broadly stated, all inodes of the write-anywhere file system are organized into the inode file. A file system (fs) info block specifies the layout of information in the file system and includes an inode of a file that includes all other inodes of the file system. Each logical volume (file system) has an fsinfo block that is preferably stored at a fixed location within, e.g., a RAID group. The inode of the inode file may directly reference (point to) data blocks of the inode file or may reference indirect blocks of the inode file that, in turn, reference data blocks of the inode file. Within each data block of the inode file are embedded inodes, each of which may reference indirect blocks that, in turn, reference data blocks of a file.

Operationally, a request from the client 180 is forwarded as a packet over the computer network 140 and onto the node 200 where it is received at the network adapter 225. A network driver (of layer 312 or layer 330) processes the packet and, if appropriate, passes it on to a network protocol and file access layer for additional processing prior to forwarding to the write-anywhere file system 360. Here, the file system generates operations to load (retrieve) the requested data from disk 130 if it is not resident "in core", i.e., in memory 224. If the information is not in memory, the file system 360 indexes into the inode file using the inode number to access an appropriate entry and retrieve a logical vbn. The file system then passes a message structure including the logical vbn to the RAID system 380; the logical vbn is mapped to a disk identifier and disk block number (disk,dbn) and sent to an appropriate driver (e.g., SCSI) of the disk driver system 390. The disk driver accesses the dbn from the specified disk 130 and loads the requested data block(s) in memory for processing by the node. Upon completion of the request, the node (and operating system) returns a reply to the client 180 over the network 140.

Included in the storage operating system 300 is a set of inode to pathname (I2P) functions 364. The I2P functions 364, in conjunction with the file system 360, illustratively implement I2P mapping functionality in accordance with the present invention. One exemplary technique for I2P mappings is described in the commonly-owned, co-pending U.S. Patent Application Publication No. US 2006/0288026, entitled SYSTEM AND METHOD FOR GENERATING AND MAINTAINING INODE TO PATHNAME MAPPING INFORMATION, by Ed Zayas, et al. published on Dec. 21, 2006, the contents of which are hereby incorporated by reference in their entirety. The I2P functions 364 may include various scanners, described further below, that operate to install/remove I2P mappings in accordance with embodiments of the present invention. Additionally, the I2P functions 364 may include an application program interface (API) that is exposed to enable other processes executing within the storage operating system to perform I2P mappings. The API may also be accessible via remote procedure calls (RPCs) to enable programs executing on other computers in network environment 100 to perform I2P mapping functions. Also included within the file system 360 is a lock manager 363 and a watch process 363, which implements the novel Change Notify support procedures of the present invention (e.g., in conjunction with watch process 323 of N-module 310).

It should be noted that the software "path" through the storage operating system layers described above needed to perform data storage access for the client request received at the node may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by node 200 in response to a request issued by client 180. Moreover, in another alternate embodiment of the invention, the processing elements of adapters 225, 228 may be configured to offload some or all of the packet processing and storage access operations, respectively, from processor 222, to thereby increase the performance of the storage service provided by the node. It is expressly contemplated that the various processes, architectures, and procedures described herein can be implemented in hardware, firmware or software.

As used herein, the term "storage operating system" generally refers to the computer-executable code operable on a computer to perform a storage function that manages data access and may, in the case of a node 200, implement data access semantics of a general purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the invention described herein may apply to any type of special-purpose (e.g., file server, filer, or storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems. It should be noted that while this description is written in terms of a write any where file system, the teachings of the present invention may be utilized with any suitable file system, including a write in place file system.

D. CF Protocol

In the illustrative embodiment, the storage server 365 is embodied as D-module 350 of the storage operating system 300 to service one or more volumes of array 120. In addition, the multi-protocol engine 325 is embodied as N-module 310 to (i) perform protocol termination with respect to a client issuing incoming data access request packets over the network 140, as well as (ii) redirect those data access requests to any storage server 365 of the cluster 100. Moreover, the N-module 310 and D-module 350 cooperate to provide a highly-scalable, distributed storage system architecture of the cluster 100. To that end, each module includes a cluster fabric (CF) interface module 340a,b adapted to implement intra-cluster communication among the modules, including D-module-to-D-module communication.

The protocol layers, e.g., the NFS/CIFS layers and the iSCSI/FC layers, of the N-module 310 function as protocol servers that translate file-based and block based data access requests from clients into CF protocol messages used for communication with the D-module 350. That is, the N-module servers convert the incoming data access requests into file system primitive operations (commands) that are embedded within CF messages by the CF interface module 340 for transmission to the D-modules 350 of the cluster 100. Notably, the CF interface modules 340 cooperate to provide a single file system image across all D-modules 350 in the cluster 100. Thus, any network port of an N-module that receives a client request can access any data container within the single file system image located on any D-module 350 of the cluster.

Further to the illustrative embodiment, the N-module 310 and D-module 350 are implemented as separately-scheduled processes of storage operating system 300; however, in an alternate embodiment, the modules may be implemented as pieces of code within a single operating system process. Communication between an N-module and D-module is thus illustratively effected through the use of message passing between the modules although, in the case of remote communication between an N-module and D-module of different nodes, such message passing occurs over the cluster switching fabric 150. A known message-passing mechanism provided by the storage operating system to transfer information between modules (processes) is the Inter Process Communication (IPC) mechanism. The protocol used with the IPC mechanism is illustratively a generic file and/or block-based "agnostic" CF protocol that comprises a collection of methods/functions constituting a CF application programming interface (API). Examples of such an agnostic protocol are the SpinFS and SpinNP protocols available from Network Appliance, Inc. The SpinFS protocol is described in the above-referenced U.S. Patent Application Publication No. US 2002/0116593.

The CF interface module 340 implements the CF protocol for communicating file system commands among the modules of cluster 100. Communication is illustratively effected by the D-module exposing the CF API to which an N-module (or another D-module) issues calls. To that end, the CF interface module 340 is organized as a CF encoder and CF decoder. The CF encoder of, e.g., CF interface 340a on N-module 310 encapsulates a CF message as (i) a local procedure call (LPC) when communicating a file system command to a D-module 350 residing on the same node 200 or (ii) a remote procedure call (RPC) when communicating the command to a D-module residing on a remote node of the cluster 100. In either case, the CF decoder of CF interface 340b on D-module 350 de-encapsulates the CF message and processes the file system command.

Figure 4:
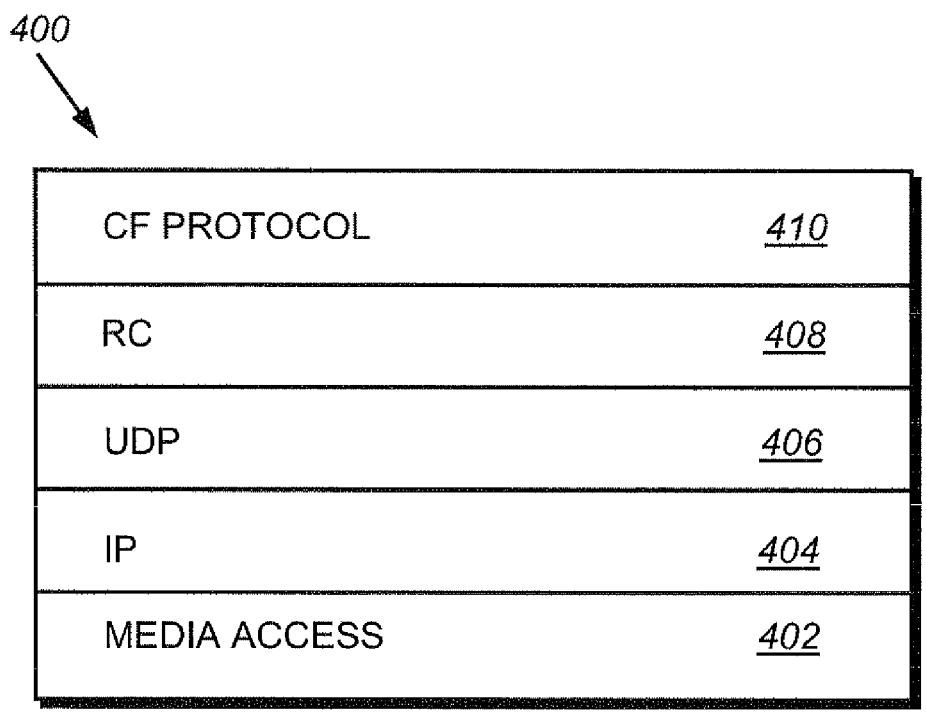
FIG. 4 is a schematic block diagram illustrating the format of a cluster fabric (CF) message in accordance with an embodiment of with the present invention.

FIG. 4 is a schematic block diagram illustrating the format of a CF message 400 in accordance with an embodiment of with the present invention. The CF message 400 is illustratively used for RPC communication over the switching fabric 150 between remote modules of the cluster 100; however, it should be understood that the term "CF message" may be used generally to refer to LPC and RPC communication between modules of the cluster. The CF message 400 includes a media access layer 402, an IP layer 404, a UDP layer 406, a reliable connection (RC) layer 408 and a CF protocol layer 410. As noted, the CF protocol is a generic file system protocol that conveys file system commands related to operations contained within client requests to access data containers stored on the cluster 100; the CF protocol layer 410 is that portion of message 400 that carries the file system commands. Illustratively, the CF protocol is datagram based and, as such, involves transmission of messages or "envelopes" in a reliable manner from a source (e.g., an N-module 310) to a destination (e.g., a D-module 350). The RC layer 408 implements a reliable transport protocol that is adapted to process such envelopes in accordance with a connectionless protocol, such as UDP 406.

Figure 5:
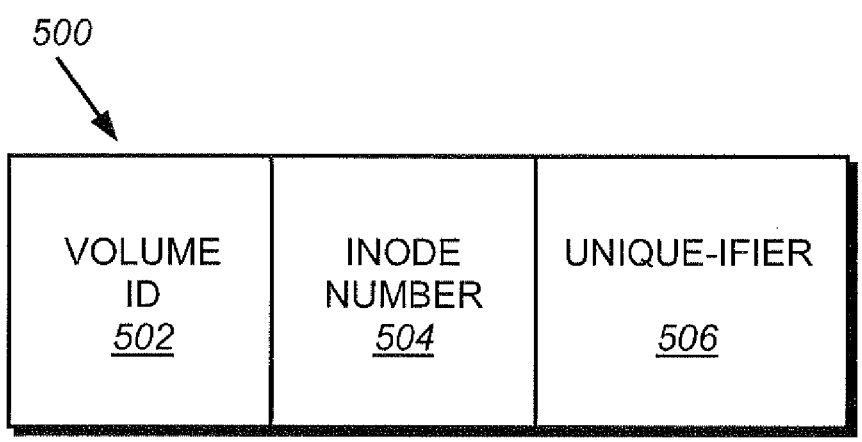
FIG. 5 is a schematic block diagram illustrating the format of a data container handle in accordance with an embodiment of the present invention.

A data container, e.g., a file, is accessed in the file system using a data container handle. FIG. 5 is a schematic block diagram illustrating the format of a data container handle 500 including a volume ID field 502, an inode number field 504 and a unique-ifier field 506. The volume ID field 502 contains a global identifier (within the cluster 100) of the volume within which the data container resides. The inode number field 504 contains an inode number of an inode (within an inode file) pertaining to the data container. The unique-ifier field 506 contains a monotonically increasing number that uniquely identifies the data container handle 500. The unique-ifier is particularly useful in the case where an inode number has been deleted, reused, and reassigned to a new data container. The unique-ifier distinguishes that reused inode number in a particular data container from a potentially previous use of those fields.

E. File System Organization

Figure 6:
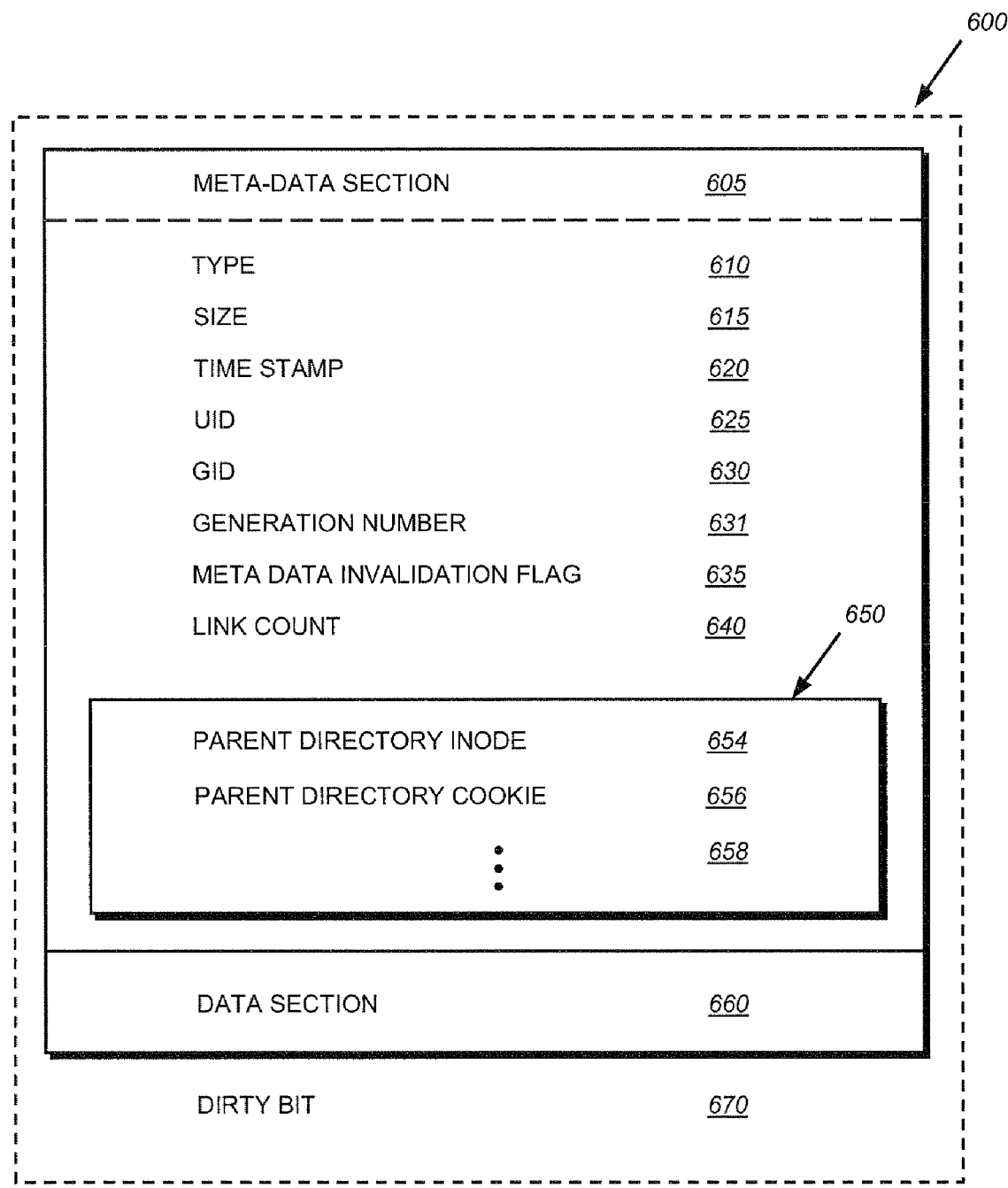
FIG. 6 is a schematic block diagram of an exemplary inode in accordance with an embodiment of the present invention.

In the illustrative embodiment, a data container is represented in the write-anywhere file system as an inode data structure adapted for storage on the disks 130. FIG. 6 is a schematic block diagram of an inode 600, which illustratively includes a meta-data section 605 and a data section 660. The information stored in the meta-data section 605 of each inode 600 describes the data container (e.g., a file) and, as such, includes the type (e.g., regular, directory, vdisk) 610 of file, its size 615, time stamps (e.g., access and/or modification time) 620, an ownership, i.e., user identifier (UID 625) and group ID (GID 630), of the file, a link count field 640, and a primary name data structure 650. The meta-data section 605 also includes a generation number 631, and a meta-data invalidation flag field 635. The meta-data invalidation flag field 635 is used to indicate whether meta-data in the inode is usable. The link count field 640 tracks the number of names (and, implicitly, the number of hard links) associated with the inode. For example, a link count of one signifies that there are no hard links to the data container and that the only name associated with the inode is the primary name.

The primary name (pathname) data structure 650 illustratively includes a parent directory inode field 654, a parent directory cookie field 656 and, in alternative embodiments, additional fields 658. The parent directory inode field 654 contains an inode value that is associated with the parent directory of the data container. Thus, if the data container is a file bar located in the foo directory (i.e., /foo/bar) then the parent directory inode field contains the inode number of the foo directory. The parent directory cookie field 656 illustratively contains a multi-bit value that identifies a directory block and entry within the directory block of the directory identified by the parent directory inode field 654.

The contents of the data section 660 of each inode may be interpreted differently depending upon the type of file (inode) defined within the type field 610. For example, the data section 660 of a directory inode contains meta-data controlled by the file system, whereas the data section of a regular inode contains file system data. In this latter case, the data section 660 includes a representation of the data associated with the file.

Specifically, the data section 660 of a regular on-disk inode may include file system data or pointers, the latter referencing 4 KB data blocks on disk used to store the file system data. Each pointer is preferably a logical vbn to facilitate efficiency among the file system and the RAID system 380 when accessing the data on disks. Given the restricted size (e.g., 128 bytes) of the inode, file system data having a size that is less than or equal to 64 bytes is represented, in its entirety, within the data section of that inode. However, if the length of the contents of the data container exceeds 64 bytes but less than or equal to 64 KB, then the data section of the inode (e.g., a first level inode) comprises up to 16 pointers, each of which references a 4 KB block of data on the disk.

Moreover, if the size of the data is greater than 64 KB but less than or equal to 64 megabytes (MB), then each pointer in the data section 660 of the inode (e.g., a second level inode) references an indirect block (e.g., a first level L1 block) that contains 1024 pointers, each of which references a 4 KB data block on disk. For file system data having a size greater than 64 MB, each pointer in the data section 660 of the inode (e.g., a third level L3 inode) references a double-indirect block (e.g., a second level L2 block) that contains 1024 pointers, each referencing an indirect (e.g., a first level L1) block. The indirect block, in turn, contains 1024 pointers, each of which references a 4 KB data block on disk. When accessing a file, each block of the file may be loaded from disk 130 into the memory 224.

When an on-disk inode (or block) is loaded from disk 130 into memory 224, its corresponding in-core structure embeds the on-disk structure. For example, the dotted line surrounding the inode 600 indicates the in-core representation of the on-disk inode structure. The in-core structure is a block of memory that stores the on-disk structure plus additional information needed to manage data in the memory (but not on disk). The additional information may include, e.g., a "dirty" bit 670. After data in the inode (or block) is updated/modified as instructed by, e.g., a write operation, the modified data is marked "dirty" using the dirty bit 670 so that the inode (block) can be subsequently "flushed" (stored) to disk. The in-core and on-disk format structures of the WAFL file system, including the inodes and inode file, are disclosed and described in commonly-owned U.S. Pat. No. 5,819,292 titled METHOD FOR MAINTAINING CONSISTENT STATES OF A FILE SYSTEM AND FOR CREATING USER-ACCESSIBLE READ-ONLY COPIES OF A FILE SYSTEM by David Hitz et al., issued on Oct. 6, 1998, the contents of which are hereby incorporated by reference in its entirety.

Figure 7:
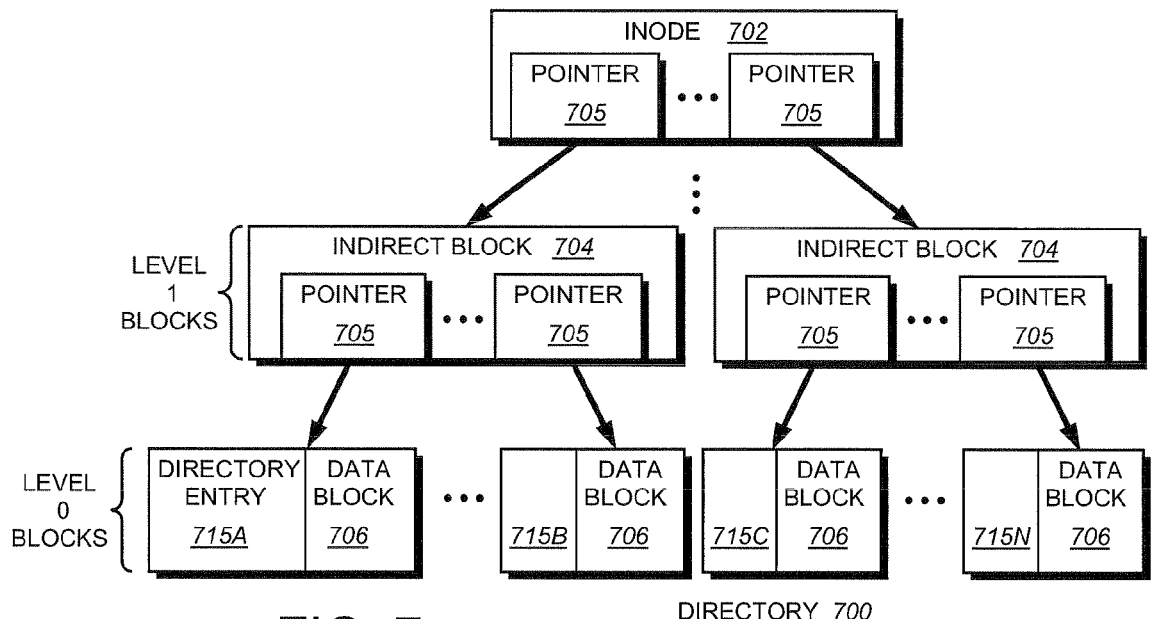
FIG. 7 is a schematic block diagram of an exemplary buffer tree in accordance with an embodiment of the present invention.

FIG. 7 is a schematic block diagram of an embodiment of a buffer tree of a file that may be advantageously used with the present invention. The buffer tree is an internal representation of blocks for a type of file (e.g., directory 700) loaded into the memory 224 and maintained by the write-anywhere file system 360. A root (top-level) inode 702, such as an embedded inode, references indirect (e.g., level 1) blocks 704. Note that there may be additional levels of indirect blocks (e.g., level 2, level 3) depending upon the size of the directory. The indirect blocks (and inode) contain pointers 705 that ultimately reference data blocks 706 used to store the actual data of the directory. That is, the data of directory 700 are contained in data blocks and the locations of these blocks are stored in the indirect blocks of the directory. Each level 1 indirect block 704 may contain pointers to as many as 1024 data blocks. According to the "write anywhere" nature of the file system, these blocks may be located anywhere on the disks 130.

Also, in accordance with an embodiment of the present invention, each data block 706 comprises one or more directory entries 715 A-N. Illustratively, the parent directory cookie value 656 uniquely identifies a particular directory entry within the directory identified by the parent directory inode field 654. That is, the inode identified by the parent directory inode field 424 identifies a directory inode 702. The parent directory cookie value 656 identifies a particular level 0 data block 706 of the directory and a particular directory entry 715 within that level 0 data block 706.

A file system layout is provided that apportions an underlying physical volume into one or more virtual volumes (or flexible volume) of a storage system, such as node 200. An example of such a file system layout is described in U.S. Patent Application Publication No. US 2005/0246401 titled EXTENSION OF WRITE ANYWHERE FILE SYSTEM LAYOUT, by John K. Edwards et al. published Nov. 3, 2005, and assigned to Network Appliance, Inc. The underlying physical volume is an aggregate comprising one or more groups of disks, such as RAID groups, of the node. The aggregate has its own physical volume block number (pvbn) space and maintains meta-data, such as block allocation structures, within that pvbn space. Each flexible volume has its own virtual volume block number (vvbn) space and maintains meta-data, such as block allocation structures, within that vvbn space. Each flexible volume is a file system that is associated with a container file; the container file is a file in the aggregate that contains all blocks used by the flexible volume. Moreover, each flexible volume comprises data blocks and indirect blocks that contain block pointers that point at either other indirect blocks or data blocks.

In one embodiment, pvbns are used as block pointers within buffer trees of types of files (such as directory 700) stored in a flexible volume. This "hybrid" flexible volume embodiment involves the insertion of only the pvbn in the parent indirect block (e.g., Mode or indirect block). On a read path of a logical volume, a "logical" volume (vol) info block has one or more pointers that reference one or more fsinfo blocks, each of which, in turn, points to an Mode file and its corresponding Mode buffer tree. The read path on a flexible volume is generally the same, following pvbns (instead of vvbns) to find appropriate locations of blocks; in this context, the read path (and corresponding read performance) of a flexible volume is substantially similar to that of a physical volume. Translation from pvbn-to-disk,dbn occurs at the file system/RAID system boundary of the storage operating system 300.

Figure 8:
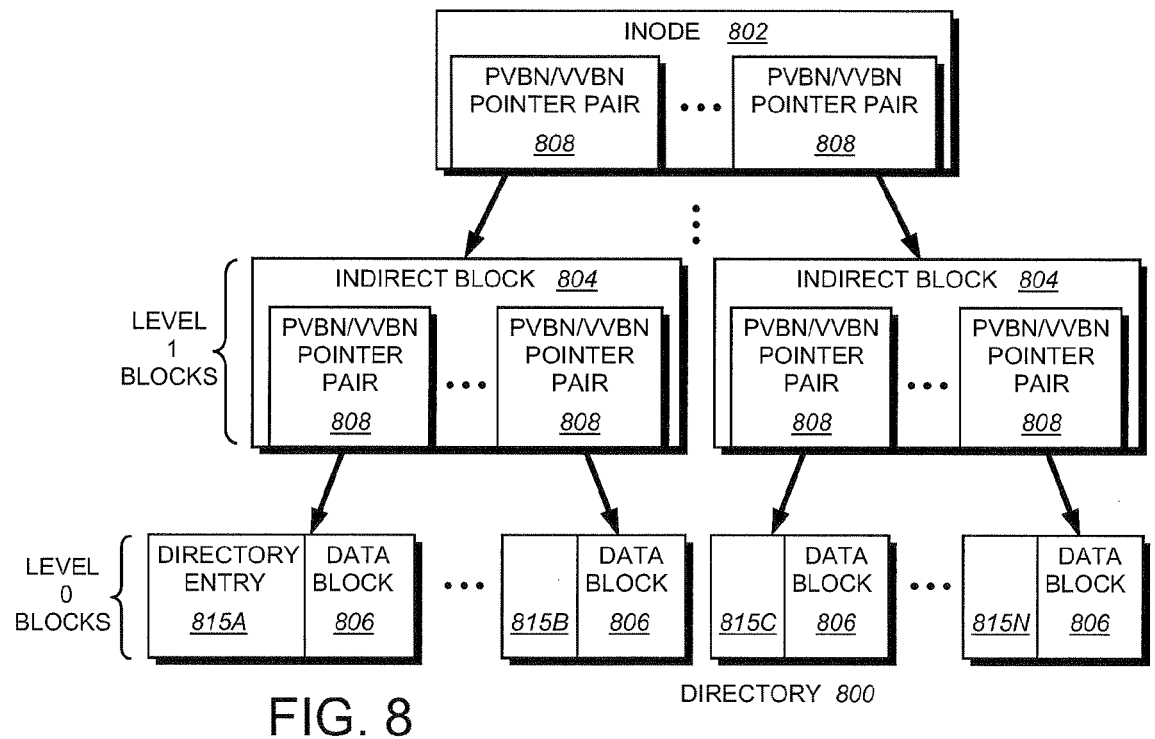
FIG. 8 is a schematic block diagram of an illustrative embodiment of a buffer tree of a directory that may be advantageously used with the present invention.

In an illustrative dual vbn hybrid flexible volume embodiment, both a pvbn and its corresponding vvbn are inserted in the parent indirect blocks in the buffer tree of a type of file (e.g., a directory). That is, the pvbn and vvbn are stored as a pair for each block pointer in most buffer tree structures that have pointers to other blocks, e.g., level 1 (L1) indirect blocks, Mode file level 0 (L0) blocks. FIG. 8 is a schematic block diagram of an illustrative embodiment of a buffer tree of a directory 800 that may be advantageously used with the present invention. A root (top-level) Mode 802, such as an embedded Mode, references indirect (e.g., level 1) blocks 804. Note that there may be additional levels of indirect blocks (e.g., level 2, level 3) depending upon the size of the directory. The indirect blocks (and Mode) contain pvbn/vvbn pointer pair structures 808 that ultimately reference data blocks 806 used to store the actual data of the directory. As noted above in FIG. 7, data blocks 806 of directory 800 contain directory entries 815A-N.

The pvbns reference locations on disks of the aggregate, whereas the vvbns reference locations within files of the flexible volume. The use of pvbns as block pointers 808 in the indirect blocks 804 provides efficiencies in the read paths, while the use of vvbn block pointers provides efficient access to required meta-data. That is, when freeing a block of a file, the parent indirect block in the file contains readily available vvbn block pointers, which avoids the latency associated with accessing an owner map to perform pvbn-to-vvbn translations; yet, on the read path, the pvbn is available.

Figure 9:
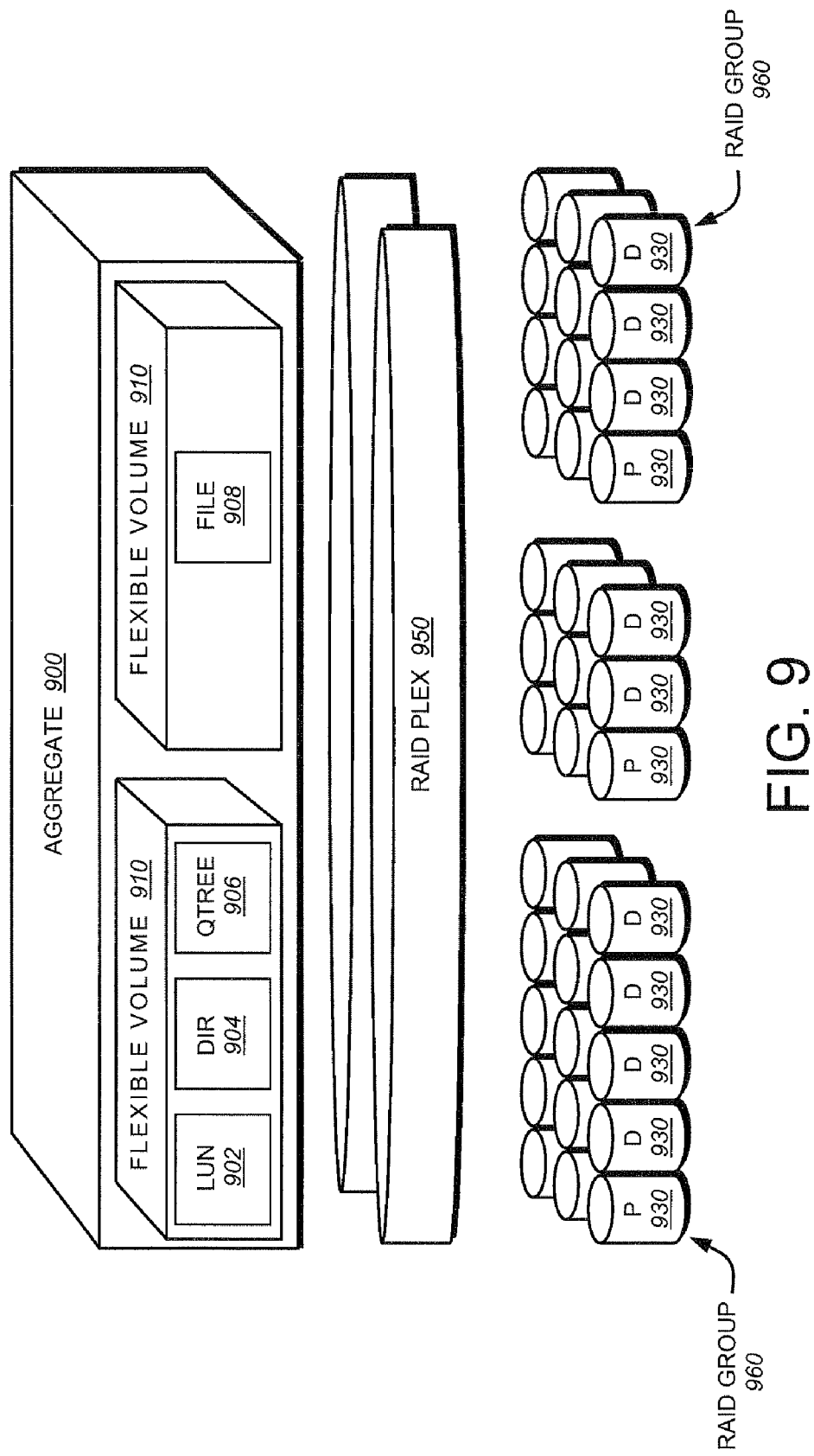
FIG. 9 is a schematic block diagram of an exemplary aggregate in accordance with an embodiment of the present invention.

FIG. 9 is a schematic block diagram of an embodiment of an aggregate 900 that may be advantageously used with the present invention. Luns (blocks) 902, directories 904, qtrees 906 and files 908 may be contained within flexible volumes 910, such as dual vbn flexible volumes, that, in turn, are contained within the aggregate 900. The aggregate 900 is illustratively layered on top of the RAID system, which is represented by at least one RAID plex 950 (depending upon whether the storage configuration is mirrored), wherein each plex 950 comprises at least one RAID group 960. Each RAID group further comprises a plurality of disks 930, e.g., one or more data (D) disks and at least one (P) parity disk.

Whereas the aggregate 900 is analogous to a physical volume of a conventional storage system, a flexible volume is analogous to a file within that physical volume. That is, the aggregate 900 may include one or more files, wherein each file contains a flexible volume 910 and wherein the sum of the storage space consumed by the flexible volumes is physically smaller than (or equal to) the size of the overall physical volume. The aggregate utilizes a physical pvbn space that defines a storage space of blocks provided by the disks of the physical volume, while each embedded flexible volume (within a file) utilizes a logical vvbn space to organize those blocks, e.g., as files. Each vvbn space is an independent set of numbers that corresponds to locations within the file, which locations are then translated to dbns on disks. Since the flexible volume 910 is also a logical volume, it has its own block allocation structures (e.g., active, space and summary maps) in its vvbn space.

A container file is a file in the aggregate that contains all blocks used by a flexible volume. The container file is an internal (to the aggregate) feature that supports a flexible volume; illustratively, there is one container file per flexible volume. Similar to a pure logical volume in a file approach, the container file is a hidden file (not accessible to a user) in the aggregate that holds every block in use by the flexible volume. The aggregate includes an illustrative hidden meta-data root directory that contains subdirectories of flexible volumes:

WAFL/fsid/filesystem file, storage label file

Specifically, a physical file system (WAFL) directory includes a subdirectory for each flexible volume in the aggregate, with the name of subdirectory being a file system identifier (fsid) of the flexible volume. Each fsid subdirectory (flexible volume) contains at least two files, a filesystem file and a storage label file. The storage label file is illustratively a 4 KB file that contains meta-data similar to that stored in a conventional raid label. In other words, the storage label file is the analog of a raid label and, as such, contains information about the state of the flexible volume such as, e.g., the name of the flexible volume, a universal unique identifier (uuid) and fsid of the flexible volume, whether it is online, being created or being destroyed, etc.

Figure 10:
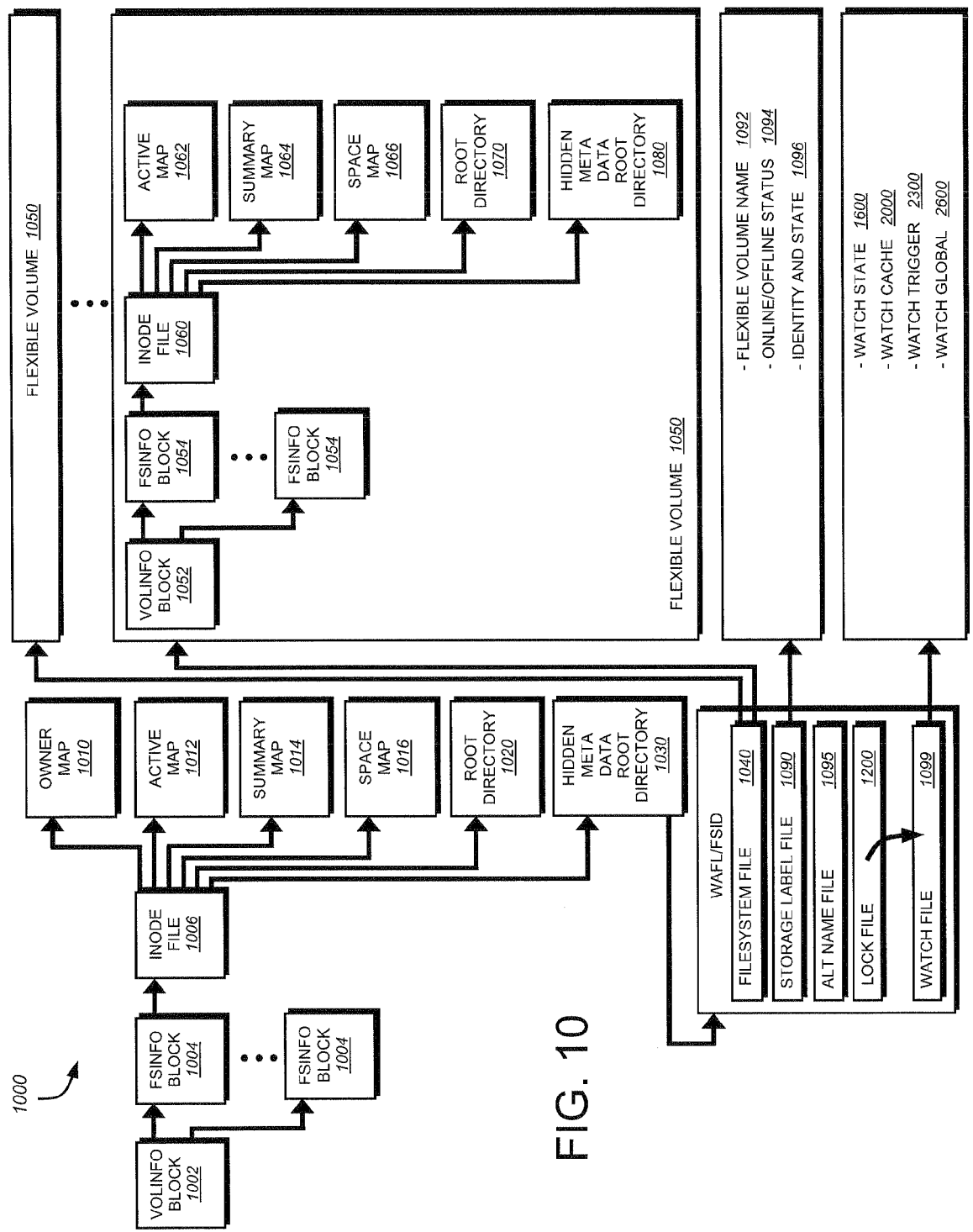
FIG. 10 is a schematic block diagram of an exemplary on-disk layout of an aggregate in accordance with an embodiment of the present invention.

FIG. 10 is a schematic block diagram of an on-disk representation of an aggregate 1000. The storage operating system 300, e.g., the RAID system 380, assembles a physical volume of pvbns to create the aggregate 1000, with pvbns 1 and 2 comprising a "physical" volinfo block 1002 for the aggregate. The volinfo block 1002 contains block pointers to fsinfo blocks 1004, each of which may represent a snapshot of the aggregate. Fsinfo block 1004 may contains a set of volume options including whether I2P mapping is active for the volume 1000. In the illustrative embodiment, I2P mapping may be activated/deactivated on a per volume basis (e.g., by an administrator).

Each fsinfo block 1004 also includes a block pointer to an inode file 1006 that contains inodes of a plurality of files, including an owner map 1010, an active map 1012, a summary map 1014, and a space map 1016, as well as other special meta-data files. The inode file 1006 further includes a root directory 1020 and a "hidden" meta-data root directory 1030, the latter of which includes a namespace having files related to a flexible volume in which users cannot "see" the files. The hidden meta-data root directory includes the WAFL/fsid/ directory structure that contains filesystem file 1040 and storage label file 1090. Note that root directory 1020 in the aggregate is empty; all files related to the aggregate are organized within the hidden meta-data root directory 1030.

In addition to being embodied as a container file having level 1 blocks organized as a container map, the filesystem file 1040 includes block pointers that reference various file systems embodied as flexible volumes 1050. The aggregate 1000 maintains these flexible volumes 1050 at special reserved inode numbers. Each flexible volume 1050 also has special reserved inode numbers within its flexible volume space that are used for, among other things, the block allocation bitmap structures. As noted, the block allocation bitmap structures, e.g., active map 1062, summary map 1064 and space map 1066, are located in each flexible volume.

Specifically, each flexible volume 1050 has the same inode file structure/content as the aggregate, with the exception that there is no owner map and no WAFL/fsid/filesystem file, storage label file directory structure in a hidden meta-data root directory 1080. To that end, each flexible volume 1050 has a volinfo block 1052 that points to one or more fsinfo blocks 1054, each of which may represent a snapshot, along with the active file system of the flexible volume. Each fsinfo block, in turn, points to an inode file 1060 that, as noted, has the same inode structure/content as the aggregate with the exceptions noted above. Each flexible volume 1050 has its own inode file 1060 and distinct inode space with corresponding inode numbers, as well as its own root (fsid) directory 1070 and subdirectories of files that can be exported separately from other flexible volumes.

The storage label file 1090 contained within the hidden meta-data root directory 1030 of the aggregate is a small file that functions as an analog to a conventional raid label. A raid label includes physical information about the storage system, such as the volume name; that information is loaded into the storage label file 1090. Illustratively, the storage label file 1090 includes the name 1092 of the associated flexible volume 1050, the online/offline status 1094 of the flexible volume, and other identity and state information 1096 of the associated flexible volume (whether it is in the process of being created or destroyed). Illustratively, an alternate name file 1095 is located in the hidden meta-data directory 1030. The alternate name file 1095 is utilized to store I2P mapping information associated with alternate names of an inode and is illustratively implemented as a balanced (e.g., B+) tree structure to enable fast searches. Further, lock file 1200 and watch file 1099 may also be included within the hidden meta-data directory 1030, as described herein.

F. Management Processes

Figure 11:
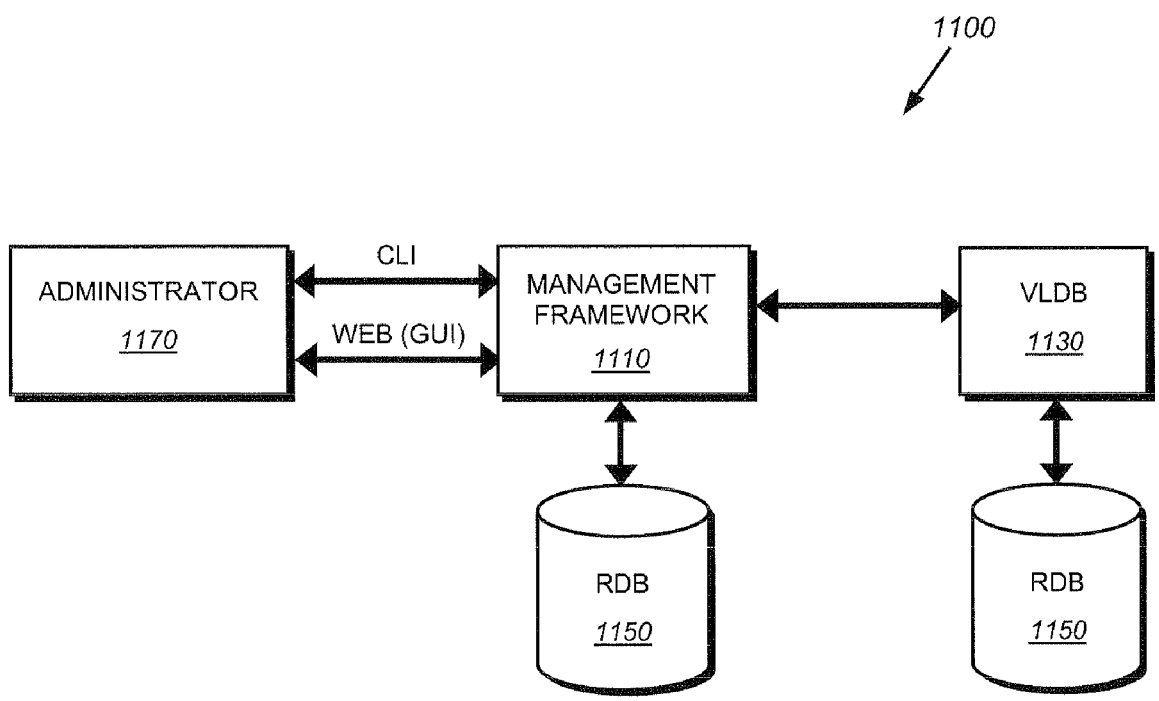
FIG. 11 is a schematic block diagram illustrating a collection of management processes in accordance with an embodiment of the present invention.

FIG. 11 is a schematic block diagram illustrating a collection of management processes that execute as user inode applications 1100 on the storage operating system 300 to provide management of configuration information (i.e. management data) for the nodes of the cluster. To that end, the management processes include a management framework process 1110 and a volume location database (VLDB) process 1130, each utilizing a data replication service (RDB 1150) linked as a library. The management framework 1110 provides a user to an administrator 1170 interface via a command line interface (CLI) and/or a web-based graphical user interface (GUI). The management framework is illustratively based on a conventional common interface model (CIM) object manager that provides the entity to which users/system administrators interact with a node 200 in order to manage the cluster 100.

The VLDB 1130 is a database process that tracks the locations of various storage components (e.g., flexible volumes, aggregates, etc.) within the cluster 100 to thereby facilitate routing of requests throughout the cluster. In the illustrative embodiment, the N-module 310 of each node accesses a configuration table 235 that maps the volume ID 502 of a data container handle 500 to a D-module 350 that "owns" (services) the data container within the cluster. The VLDB includes a plurality of entries which, in turn, provide the contents of entries in the configuration table 235; among other things, these VLDB entries keep track of the locations of the flexible volumes (hereinafter generally "volumes 910") and aggregates 900 within the cluster.

G. Lock State Information

Most file-level protocols include locking functionality that enables a client to transmit an operation to a software module that acts in conjunction with a file system to implement a lock on either an entire file or a defined subset of a file. A lock is a mechanism that represents the right of an owner, such as a client or system administrator, to access a shared resource. An entity later attempting to access this shared resource will be notified of the lock, which may (in the case of an exclusive lock) prevent others from accessing the resource. The types of locks can vary, for example, in some instances, there may be a write lock placed on a resource by the owner, yet other entities may be able to obtain read access to the resource. The type of lock, and/or the absence of a lock over a particular data container, such as a file, or portion thereof are referred to herein as a "lock state." In particular, once the lock (e.g., a write lock) is granted, only the client owning the lock may perform certain operations (e.g., write operations) directed to the file or subset thereof. Other clients attempting such operations will have these operations denied by the file system. Typically, the file system maintains the current lock state in the memory of the storage system, i.e., in core. That is, if a client acquires a lock, information concerning the lock is typically retained in an in-memory data construct that may be quickly accessed by the file system when determining whether to permit/deny subsequently later requested operations.

Commonly-owned, copending U.S. Pat. No. 7,587,558, entitled SYSTEM AND METHOD FOR MANAGING HARD LOCK STATE INFORMATION IN A DISTRIBUTED STORAGE SYSTEM ENVIRONMENT, filed on Nov. 1, 2005 by Toby Smith, et al., describes providing a technique for managing lock state information in a distributed storage system architecture comprising two or more volumes distributed across a plurality of nodes interconnected as a cluster. In particular, as described therein, a lock manager 362 is configured to efficiently manage the lock state information (lock file 1200), including granting, revoking, and releasing of various types of locks on data containers or ranges of data containers stored on the storage system.

Figure 12:
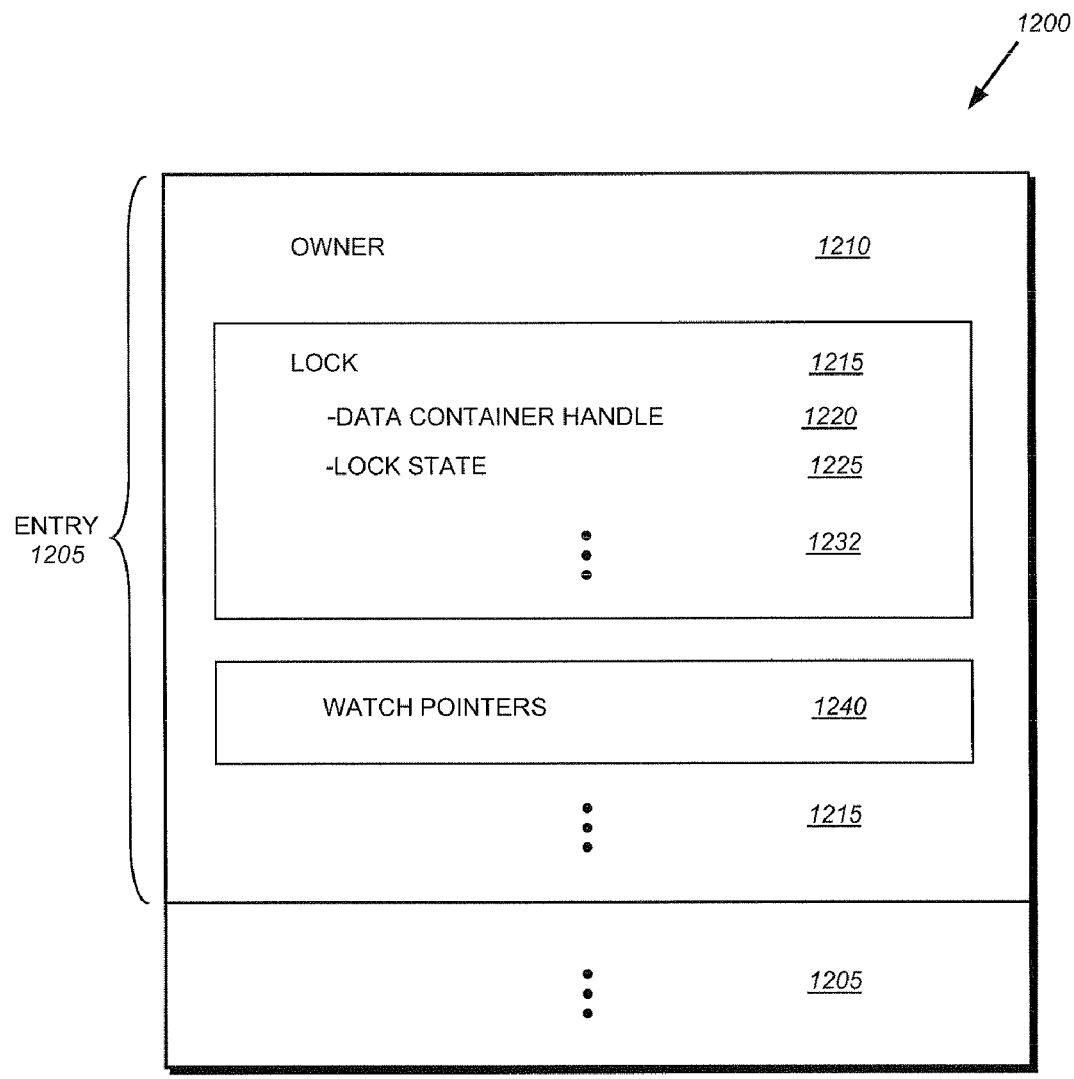
FIG. 12 is a schematic block diagram of an exemplary lock file in accordance with an embodiment of the present invention.

Briefly, FIG. 12 is a schematic block diagram of an exemplary lock file 1200 in accordance with an embodiment of the present invention. The lock file 1200 illustratively comprises a plurality of entries 1205. Each entry 1205 contains an owner field 1210 and one or more lock fields 1215, i.e., each entry is associated with a single owner of one or more locks in the file system. Each lock field 1215 illustratively comprises a data container handle field 1220, a lock state field 1225 and in alternate embodiments, additional fields 1232. The data container handle field 1220 contains a data container (e.g., a file) handle identifying the file with which the lock is associated. The lock state field 1225 identifies the current state of the lock including, e.g., type, range, etc. Also, in accordance with one or more embodiments of the present invention, each entry 1205 may also contain a watch pointer field 1240, to point to associated watches corresponding to the data container identified in file handle field 1220.

H. I2P Mapping Operations

Certain events occurring within the storage system and/or a storage operating system executing thereon may result in a message being displayed to an administrator. For example, the storage system may detect that one or more data containers have become corrupted. A pathname provides a way for the administrator to refer to a data container served by the storage system. To that end, each pathname typically represents one data container within the hierarchical structure of the file system. However, the storage system typically reports the identity of the data container to the administrator by using its associated inode number. The inode number is used internally within the file system to identify the inode associated with the data container and, unfortunately, is not easily understood by humans. It is therefore desirous for the administrator to know the pathname of the data container to which the message relates so that appropriate action may be taken. One technique for generating inode to pathname information (I2P) is described in the above incorporated U.S. Patent Application Publication No. US 2006/0288026, entitled SYSTEM AND METHOD FOR GENERATING AND MAINTAINING INODE TO PATHNAME MAPPING INFORMATION, by Ed Zayas, et al. published on Dec. 21, 2006. In such an environment, a primary name data structure is included within each inode. The primary name data structure contains information identifying a specific directory entry associated with a primary name of the data container. Illustratively, additional names for a data container, e.g., hard links, may be stored in an alternate name file in a meta-data directory within the file system.

As described in the above-incorporated U.S. patent application Ser. No. 11/156,679, filed on Jun. 20, 2005 by Edward R. Zayas et al., the I2P functions 364 of the storage operating system 300 operate in conjunction with the file system 360 to permit processes to read and/or write I2P information from either a primary name data structure 650 within an inode 600 or from an alternate name file 1095. Such reading/writing operations, described further below, may be utilized by the various watch processes 363 of the present invention. In accordance with the illustrative embodiment of the present invention, any reading/writing techniques for obtaining/setting the I2P information may be utilized. As such, these procedures should be taken as exemplary only.

Figure 13:
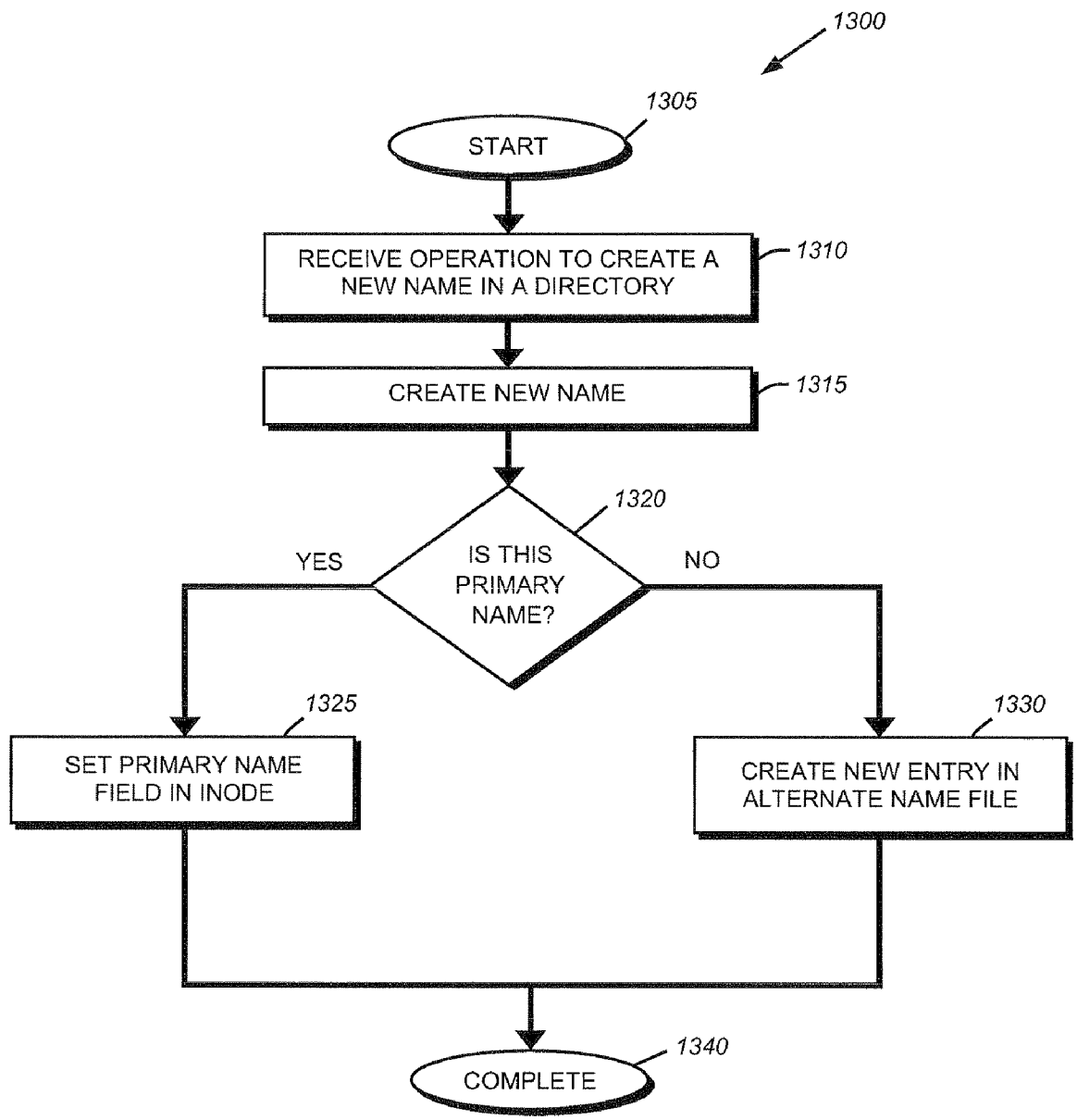
FIG. 13 is a flowchart detailing the steps of a procedure for creating a new name in a directory in accordance with an embodiment of the present invention.

FIG. 13 is a flowchart detailing the steps of a procedure 1300 for creating a new name in a directory in accordance with an embodiment of the present invention. Procedure 1300 is illustratively performed by the file system and associated I2P functions when a data container is first created and/or a new hard link is generated to a particular data container. The procedure 1300 begins in step 1305 and continues to step 1310 where the file system receives an operation to create a new name in a particular directory. As noted above, the operation may be a create file operation or a create hard link operation. In response, the file system creates the new name in step 1315 using conventional file system operations. In step 1320, the file system, in conjunction with the I2P functions 364, determines whether the new name is the primary name for the data container. If, for example, the operation is a create file operation, the new name is the primary name because the data container is associated with no other name. However, if the operation is a create hard link operation, then the data container already has a primary name reflecting the name of the data container originally created. If the new name is the primary name, the procedure branches to step 1325 where the file system and I2P functions load the appropriate fields within the primary name data structure 650 of the inode. The procedure then completes in step 1340. However, if in step 1320, a determination is made that the new name is not the primary name, then the procedure continues to step 1330 where the file system and I2P functions create a new entry in the alternate name file 1095. Notably, this entry is illustratively stored as a triplet of the inode, the parent directory inode, and the parent directory cookie value. The procedure then completes in step 1340.

Figure 14:
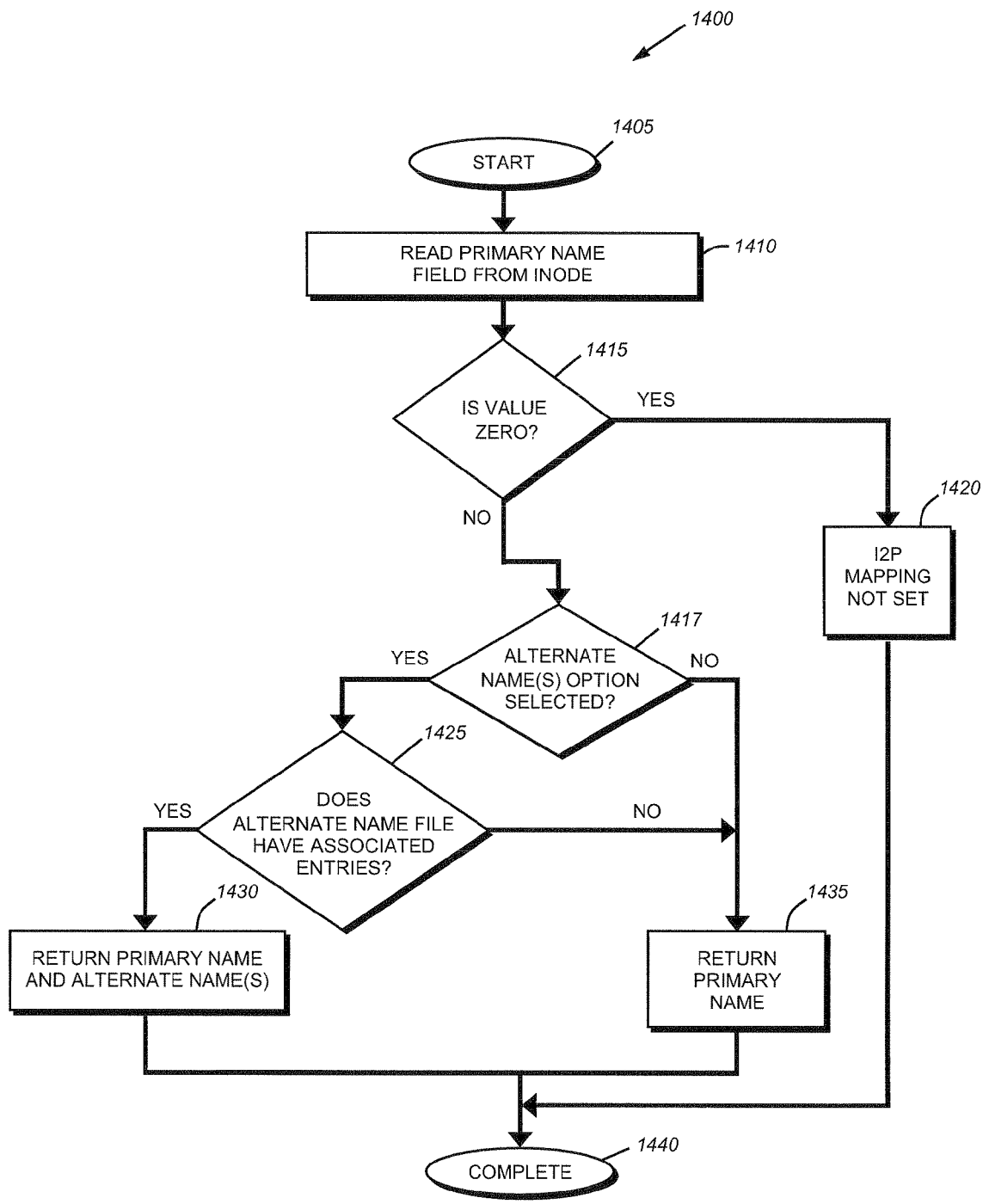
FIG. 14 is a flowchart detailing the steps of a procedure for retrieving I2P information in accordance with an embodiment of the present invention (i.e., "traversing" the I2P mapping information)

FIG. 14 is a flowchart detailing the steps of a procedure 1400 for retrieving I2P information in accordance with an embodiment of the present invention (i.e., "traversing" the I2P mapping information). This procedure may be invoked by an administrator or user entering a command to retrieve the I2P information, or more particularly, in response to a triggered watch event in accordance with the present invention. An exemplary command (e.g., CLI command) for retrieving I2P mapping information is:

inodepath -v <volume> [-a] [-s <PCPIname>] <inodenumber> where the -v option identifies the volume name identified in the <volume> field in which the inode number identified in the <inodenumber> field is located. Illustratively, the -a option causes the command to print all of the names associated with the inode (identified by the inode number), i.e., the primary name and all alternate names associated with the inode. In an exemplary embodiment the program defaults to only displaying the primary name. The -s option causes the program to display the name(s) associated with the inode <inodenumber> located within the PCPI having the name <PCPIname>. Thus, the program may display/return names associated with previous point-in-time images of the file system. In the illustrative embodiment, the I2P functions 364 of the storage operating system 300 may be used by watch processes 362 to retrieve I2P information, accordingly.

The procedure 1400 begins in step 1405 and continues to step 1410 where the file system and I2P functions retrieve (read) the primary name data structure 650 from the inode. In step 1415, the file system and I2P functions determine whether the primary name data structure contains a zero value. Illustratively, a zero value within the primary name data structure signifies that the file system has not yet identified the appropriate I2P mapping information for this inode. This may be because an initial scan, described further below, has not yet reached this particular inode or may be due to corruption of the information which has resulted in the file system clearing the I2P information to prevent incorrect results being returned. If the primary name data structure within the inode contains a zero value, the procedure branches to step 1420 signifying that the I2P mapping information is not set before completing in step 1440. Illustratively, a caller or program invoking procedure 1400 will return information signifying that the I2P mapping information is not available. In alternate embodiments, if the primary name data structure is zero, then the file system invokes the scanner, described further below, to generate the appropriate information. In such alternative embodiments the scanner, which is illustratively part of the I2P functions 364, generates the appropriate primary name data structure contents before re-initiating procedure 1400.

If, in step 1415, the value is not zero then the procedure continues to step 1417 where a determination is made whether the option, e.g., -a, has been selected to display/return alternate names. If the alternate names option has not been set, the procedure branches to step 1435 and returns the primary name before completing in step 1440.

However, if in step 1417 it is determined that the alternate names are desired, the procedure continues to step 1425 where a determination is made as to whether the alternate name file contains entries associated with this inode. If the alternate names file does not contain any associated entries, then the data container only has a primary name, which is returned in step 1435 before the procedure completes in step 740. The primary name is determined by examining the directory entry 654 in the appropriate directory that is identified by the cookie value 656 within the primary name data structure 650. However, if in step 1425 there are alternate names identified, then the file system returns the primary name and the alternate name(s) in step 1430 before completing in step 1440. The alternate name(s) are identified in a similar manner to the primary name, i.e., the directory is identified by the parent directory inode and a specific entry within the directory is identified by the cookie value.

Figure 15:
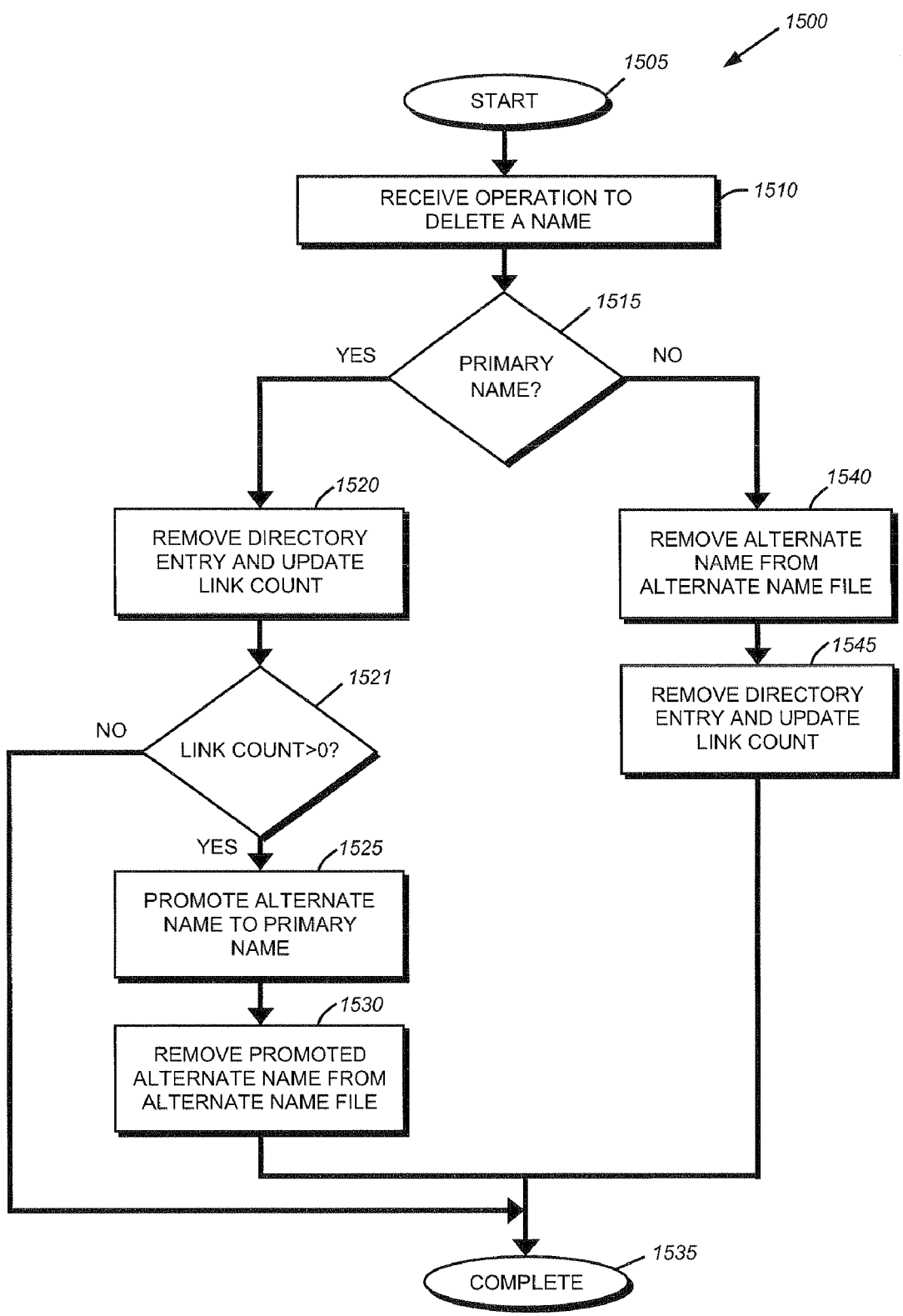
FIG. 15 is a flowchart detailing the steps of a procedure for deleting a name in accordance with an embodiment of the present invention.

FIG. 15 is a flowchart detailing the steps of a procedure 1500 for deleting a name in accordance with an embodiment of the present invention. The procedure 1500 begins in step 1505 and continues to step 1510 where an operation to delete a name is received by the file system. The file system, in conjunction with I2P functions 364, performs procedure 1500 to remove the name and to ensure that I2P mapping information remains up to date. A determination is made in step 1515 whether the name to be deleted is the primary name associated with the inode, i.e., the name stored in the primary name data structure 650 within the inode 600. If the name to be deleted is the primary name, the procedure branches to step 1520 where the file system and I2P functions remove the appropriate directory entry 715,815 and update the link count 640 of the inode.

Once the directory entry has been removed and the link count updated, the procedure proceeds to step 1521, where a determination is made as to whether the link count is greater than zero for the inode. If the link count is not greater than zero, then the procedure branches to step 1535 and completes. An inode will have a link count of zero when the one and only name associated with it is removed, thereby indicating that the data container associated with the inode may be removed from the file system.

In step 1525, an alternate name of the data container is "promoted" to the primary name. Illustratively, the first alternate name stored in the alternate name file 1095 is selected and stored within the primary name data structure 650 of the inode 600 as the new primary name. Once the newly promoted primary name has been stored, the file system and I2P functions remove the promoted alternate name from the alternate name file in step 1530 before the procedure completes in step 1535. However, if in step 1515, it is determined that the name to be deleted is not the primary name, the procedure branches to step 1540 where the name is removed from the alternate name file. This may be accomplished using conventional B+tree removal operations. In alternate embodiments, where the alternate name file is not implemented as a B+tree, appropriate conventional entry removal operations are utilized. In step 1545, the appropriate directory entry is removed and the link count of the inode is updated before the procedure completes in step 1535.

I. Supporting Change Notify Watches in Virtualized Storage Systems

The present invention overcomes the disadvantages of the prior art by providing a system and method for supporting Change Notify watches in virtualized storage systems. In particular, techniques of the present invention advantageously emulate Change Notify features (e.g., as documented by the CIFS protocol) on virtualized storage systems by leveraging virtualization mapping information (e.g., an inode-to-path or "I2P" mapping) to "walk" a file system tree backwards from the data blocks to their higher-level file and directory inodes ("ancestors") to determine whether there are applicable watches on ancestor directories, and to obtain a pathname of the watched (changed) data. In particular, changes to data received from different protocols (e.g., CIFS, NFS, HTTP, etc.) can trigger watches to clients on the virtualized storage system. Also, performance may be enhanced using various caching techniques, and watch state may be retained while moving watched data across volumes of the virtualized storage system.

As noted above, it is often desirable for a client system (or administrator) to be aware of changes to data on a storage system. "Change Notify" is a facility in CIFS network filesystems that notifies clients of any changes made to data containers, such as directories and/or files of the storage system, e.g., at a single directory level or an entire subtree level. The client identifies the directories and actions it wants reported by setting "watches" on these directories. When changes are made to a file or directory having an associated watch (as requested by the client), the watch is triggered, and a response is sent to notify the client of the change. (To be understood by those skilled in the art, changes may be conveyed to the client through NT_TRANSACT_NOTIFY_CHANGE commands of a conventional Server Message Block (SMB) NT Trans Request.) Notably, while one or more embodiments described herein reference the CIFS protocol and associated Change Notify features, changes made by other protocols, such as NFS, HTTP, FTP, etc., as will be understood by those skilled in the art, may also be watched and reported in accordance with one or more techniques described herein. In particular, by nature of a virtualized storage system, illustratively a networked virtualized storage system, arbitrary protocols may be allowed access to the stored data, and any resultant changes should be detected and reported accordingly.

As a simple example of watches and Change Notify features, assume that two user interface windows are open displaying a same directory. If a change is made within a first window, e.g., adding a file "text.txt", it may be desirable to have the change be reflected in a second window, e.g., showing the added file "text.txt". Conventional CIFS Change Notify features (without underlying virtualized storage systems) may have placed a watch on the directory, such that detecting the change within the open directory results in a change notification that updates the second window to include the added file. Also, inheritable watches may be set on directories so that events within a subtree hierarchically below the watched directory may result in notifications (e.g., directories within the watched directories). Thus, a client may set "inherited watches" on data hierarchically below a directory upon which an inheritable watch is set (e.g., other directories and/or files beneath the watched directory).

This simplified example, however, demonstrates conventional Change Notify features that are made available through the client's operating system, which locally manages storage and is thus aware of file and directory locations in storage. With virtualized network storage systems, however, such as the logical volumes served by the storage system described herein, problems may arise with supporting Change Notify watches. In particular, the client's local operating system is generally unaware of the actual physical storage locations of the files and directories on the logical volumes of the storage system, and as such, is generally unable to monitor for changes, particularly those made by clients sharing the logical volumes. Also, in a clustered storage system described herein, D-modules 350 that control the underlying physical storage are only aware that data has changed, not to which particular files or directories that data belongs (e.g., handled by N-modules 310 of the clustered storage system). This problem is particularly prevalent where an N-module 310 of one node 200 is communicating with a client that desires a directory be watched, while the directory is under the control of a D-module of another, separate, node 200. As such, prior to the inventive techniques described herein, it has been difficult to support Change Notify watches on virtualized storage systems.

Operationally, according to one or more embodiments of the present invention, data is stored on data containers of a storage system that may be arranged as one or more logical volumes (e.g., a clustered storage system), and a mapping is maintained from the data containers to corresponding parent directories of a file system of the storage system (e.g., I2P mapping). Watches may be set (e.g., by clients) on one or more of the directories to request that changes made to data stored within the directories be reported in accordance with Change Notify features. Illustratively, in the event a change is detected to data, the mapping may be traversed to determine whether there are applicable watches on ancestor directories (i.e., whether the changed data is part of (hierarchically below) a watched directory). In the event a change is detected to data stored within a directory upon which a watch is set, the mapping is (also) traversed to determine a pathname (e.g., a relative pathname) of the changed data based on the corresponding parent directories, and the pathname is reported (e.g., to the client). Notably, in accordance with expected SMB change notification mechanisms, the relative pathname from the watch to the object that was changed is what is illustratively reported.

If the watches define an action (or a plurality of actions) to be taken in response to changes, then the system also takes that action (or those actions), such as performing a "delete-pending" procedure, etc. Also, if multiple watches are set on a single directory, then the system may take the action defined by each of the plurality of watches in response to changes made to the data. In this manner, the novel techniques described herein conform to the standard CIFS protocol such that all notification events and expected Change Notify features are supported on the virtualized storage system, accordingly.

Also, according to an aspect of the present invention, triggered watch events may be cached. Such caching may increase performance and reduce storage requirements. For instance, caching may be used to prevent duplicate reports, and to prevent traversal of the mapping based on previously stored pathnames. In particular, generation numbers may be used to keep track of changes in directories being watched, inheritance of watches, the mode (events) for watches, the post (trigger or client notification) of watches, etc. Specifically, with generation numbers, the novel techniques can cache the paths and event information until further changes are made to the events or directories to be notified, as described herein.

Notably, as used herein, the term "mode" is used as a filter that a client specifies in a watch to limit what types of file system actions are watched (e.g., create, modify, delete, etc.). Also, the term "post" is the act of returning a watch notification from the D-module 350 to the N-module 310 via a notification callback mechanism. Further, "post action" represents the type of post that is occurring. In addition, as described herein, watch state may be associated with inode-based lock structures (locks 1200) that are assigned to the data, and watch volume states may be maintained by the lock manager 362.

Data Structures for Watch Support

Illustratively, there are four main classes of (in-core) data structures that may be used to implement watches in accordance with one or more embodiments of the present invention. Namely, those data structures comprise "Watch State" data structures, "Watch Cache" data structures, "Watch Trigger" data structures, and "Global" data structures, each as described in detail below.

Figure 16A:
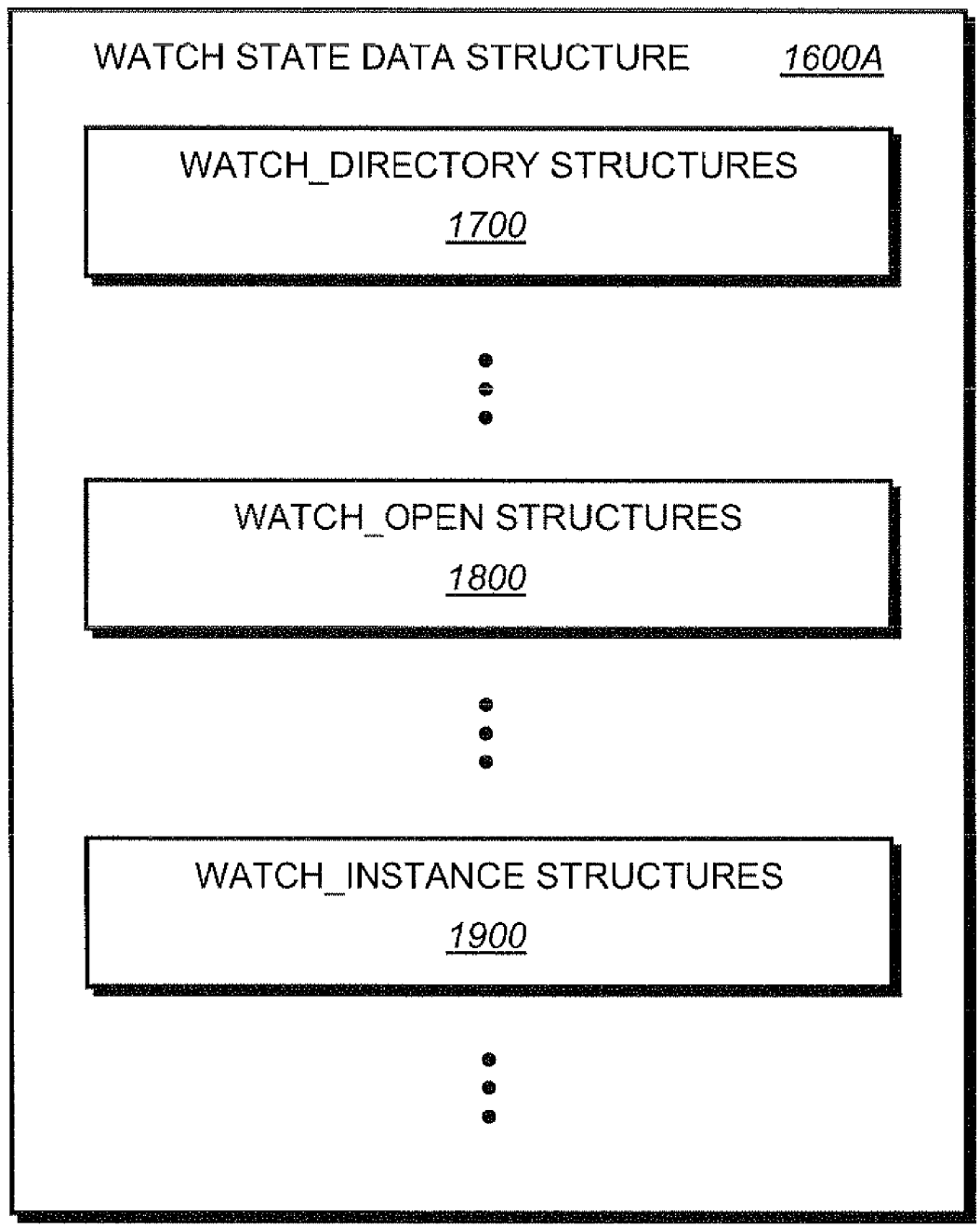
FIG. 16A is an illustrative block diagram of an example Watch State Data Structure in accordance with the present invention.
Figure 16B:
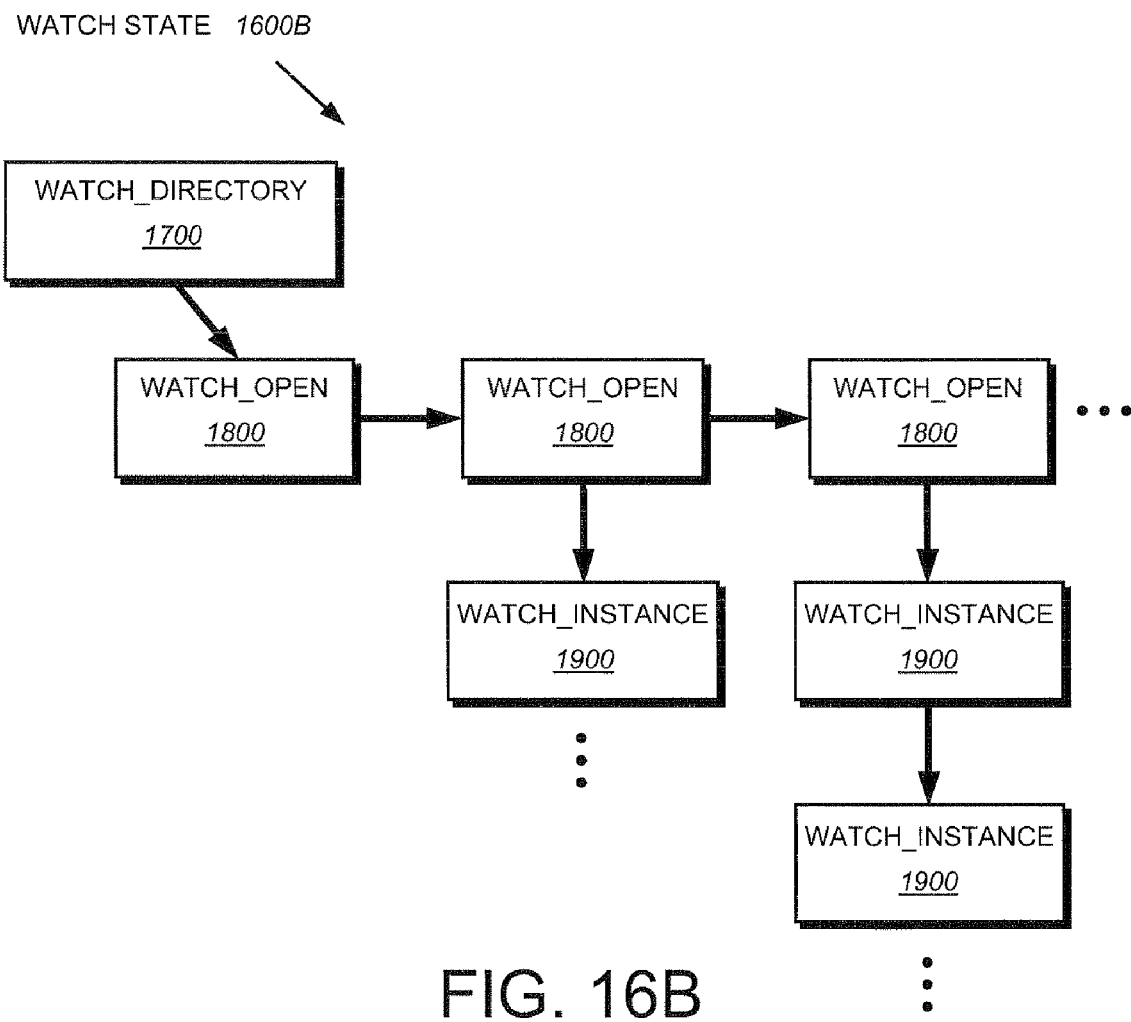
FIG. 16B is an alternate illustrative block diagram of an example arrangement/interrelation Watch State Data Structure of FIG. 16A.

FIG. 16A is an illustrative block diagram of an example Watch State Data Structure 1600a in accordance with the present invention. Watch State Data Structure 1600a may be used to capture the details and state of a watch or set of watches associated with a directory opened through the CIFS protocol. In particular, the Watch State Data Structure 1600a may have sub-structures comprising one or more Watch_Directory Structures 1700, one or more Watch_Open Structures 1800, and one or more Watch_Instance Structures 1900. FIG. 16B is an alternate illustrative block diagram of an example arrangement/interrelation 1600b of sub-structures 1700, 1800, and 1900 of the Watch State Data Structure 1600a.

Figure 17:
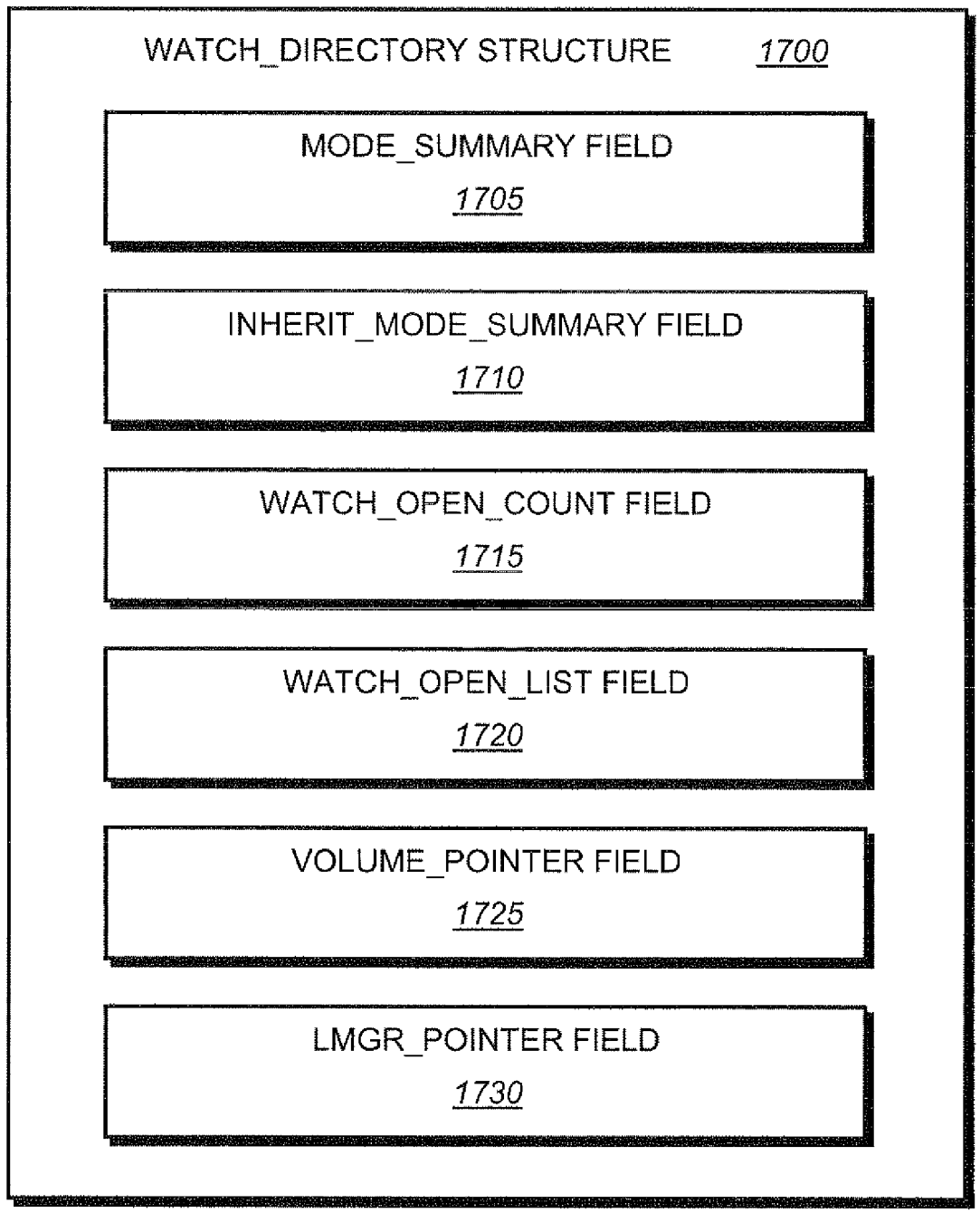
FIG. 17 is an illustrative block diagram of an example Watch_Directory Structure in accordance with the present invention.

FIG. 17 is an illustrative block diagram of an example Watch_Directory Structure 1700 in accordance with the present invention. Specifically, there is illustratively one Watch_Directory Structure 1700 linked to a directory that has watches associated with it, and it may be pointed to from the lock file 1200 on the directory. Typically, the Watch_Directory Structure 1700 is allocated when a first watch is created/set for a file/directory, and it provides a single anchor for all the individual watches set on the directory (thus, may be destroyed when the last watch associated with the directory is removed). Contained within the Watch_Directory Structure 1700 are a sum of inherited and non-inherited watch modes specified in the individual watches for the directory, as well as watch volume and file back-pointers to facilitate watch processing as described herein.

In particular, Watch_Directory Structure 1700 comprises one or more fields used to carry/store associated information. Mode_summary field 1705 contains a superset of modes on all the watches. Inherit_mode_summary field 1710 contains a mode summary for only inherited watches. Watch_open_count field 1715 contains a total number of watches for this directory. Watch_open_list field 1720 contains a list of all watches on the directory. Volume_pointer field 1725 contains a pointer to the volume containing this directory. Finally, Lmgr_pointer field 1730 contains a pointer to a lock manager file object (lock file 1200) of this directory.

Figure 18:
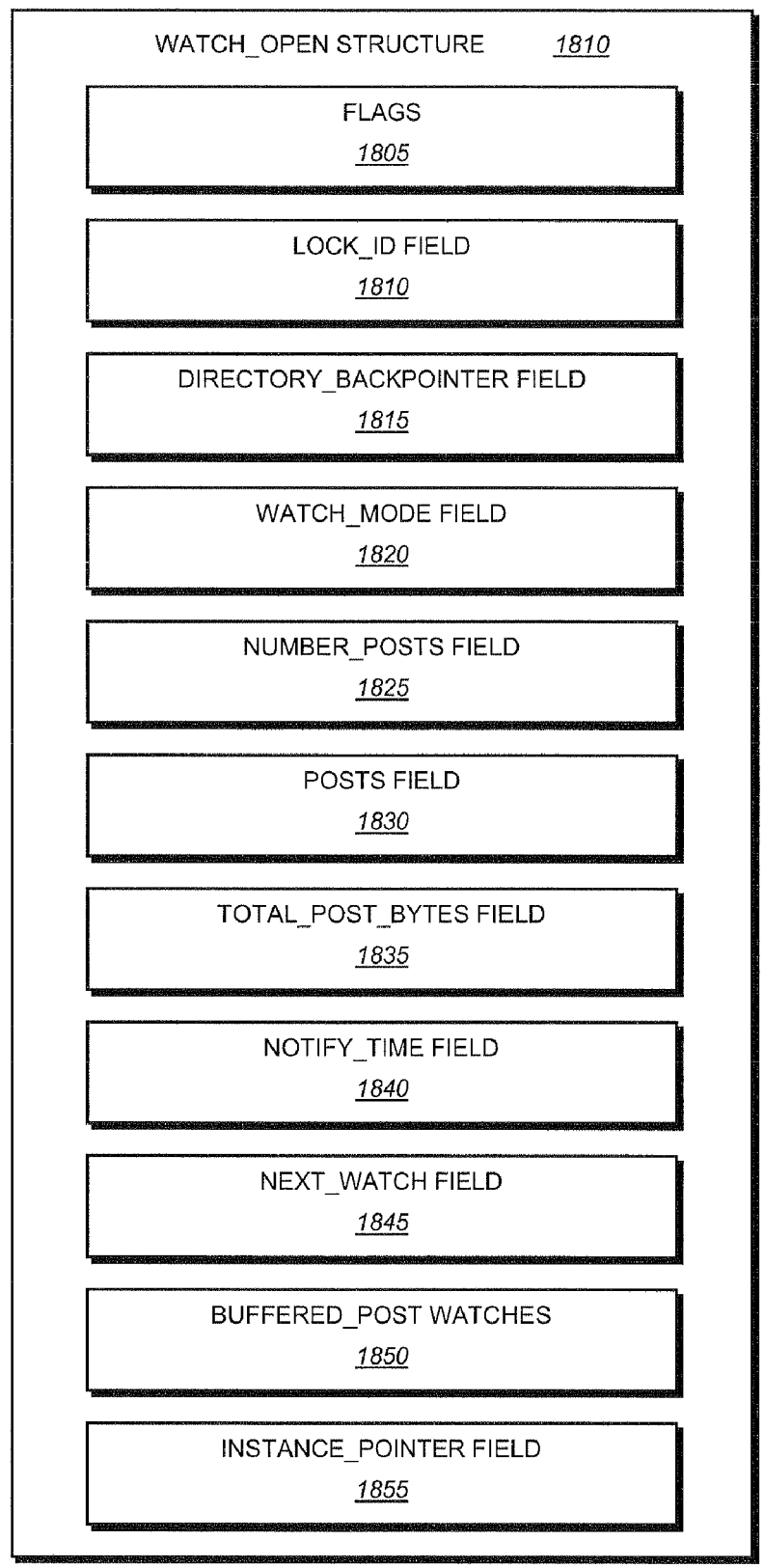
FIG. 18 is an illustrative block diagram of an example Watch_Open Structure in accordance with the present invention.

FIG. 18 is an illustrative block diagram of an example Watch_Open Structure 1800 in accordance with the present invention. Each Watch_Open Structure 1800 represents a single watch for a given client, and is valid (lives) for the life of the watch, regardless of how many times the watch triggers. (Illustratively, each Watch_Open Structure 1800 may be associated with a particular (e.g., share) lock 1215 in a one-to-one correspondence, e.g., from pointers 1240 mentioned above.) Each Watch_Open Structure 1800 may have zero or more Watch_Instance Structures 1900 associated with it (described below), each of which corresponds to a specific watch call. In this manner, multiple watch calls with the same Watch_Open Structure 1800 (lock 1215) result in a single Watch_Open Structure 1800 with several associated Watch_Instance Structures 1900 (as in FIG. 16B above). The Watch_Open Structure 1800 may also comprise various pointers that may be used to facilitate trigger and post processing, as described herein.

In particular, Watch_Open Structure 1800 comprises one or more fields used to capture watch information that is static for the life of the watch. Flags 1805 may indicate various states of the watch, such as, e.g., a "too_many" flag that is set when there is a need to indicate that there have been too_many changes to keep track of, or a "posted" flag that is true when the open is on the associated post_list (of Global Data Structure 2600). Lock_ID field 1810 identifies a lock 1215 granted to the client on file open/create. Directory_backpointer field 1815 contains a backpointer to the associated directory. Watch_mode field 1820 contains a mode that is set the first time the watch is created. Number_posts field 1825 contains a number of posts, illustratively having a buffered limit set to a maximum number of concurrent posts (e.g., 8). Posts field 1830 contains an array of posts that is pending on this open (that is, a small set of posts that are pending for Notification callback processing, described below). Total_post_bytes field 1835 contains a total number of bytes to post (e.g., used to detect a "too_many" condition). Notify_time field 1840 contains a timing value used to indicate when to trigger the next callback (e.g., set on the first post, and reset after a callback). Next_watch field 1845 links all watches (Watch_Opens 1800) for the same directory/file. Buffered_post_watches field 1850 contains a list of all watches which have some posts buffered, and are linked to the post_list 2610 of the volume. This field (1850) may be scanned by a notify callback message (described below) to fire (generate/send) the callbacks. Lastly, Instance_pointer field 1855 contains a list of zero or more instances of this watch that have been created by the client, i.e., pointers to Watch_Instance Structures 1900.

Figure 19:
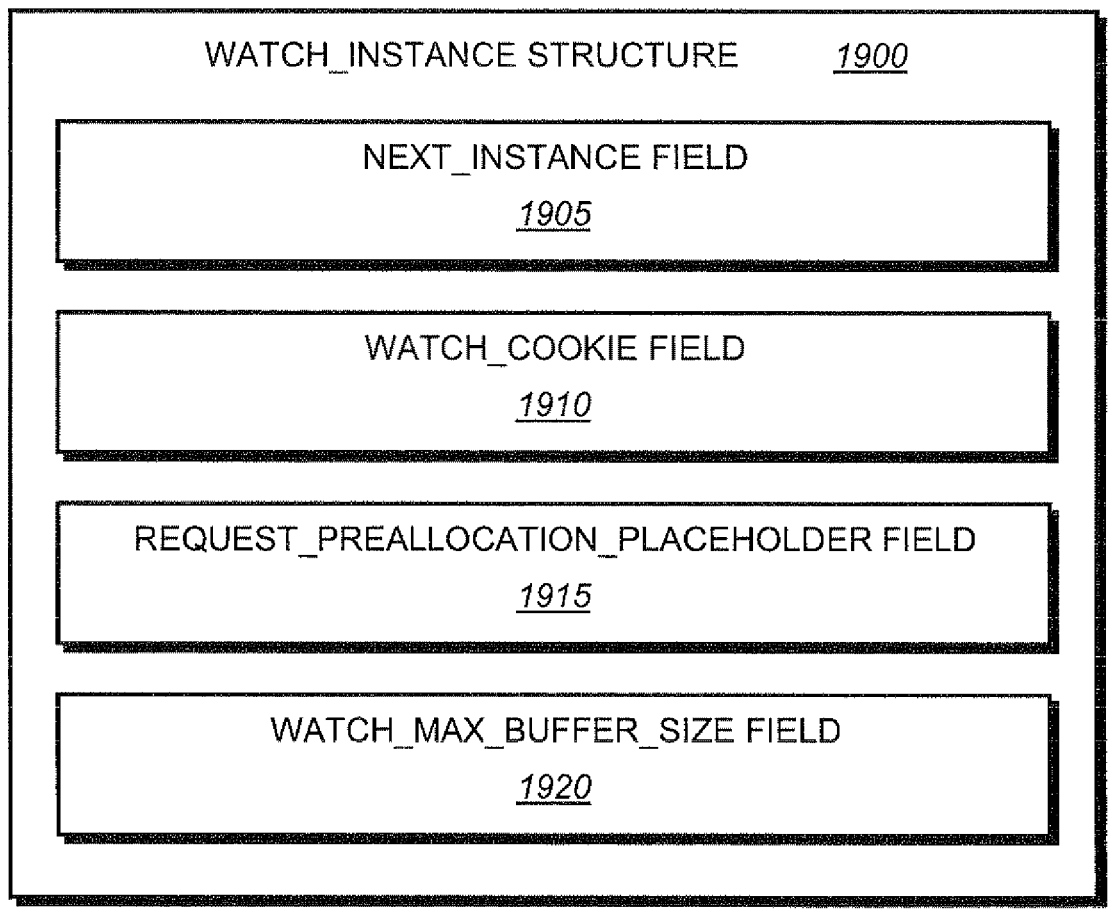
FIG. 19 is an illustrative block diagram of an example Watch_Instance Structure in accordance with the present invention.

FIG. 19 is an illustrative block diagram of an example Watch_Instance Structure 1900 in accordance with the present invention. Illustratively, a client can set several watches on the same directory (e.g., in rapid succession) using the same open instance (1800). As such, each watch should be answered, e.g., and in the order that it is received. The Watch_Instance Structure 1900 captures state necessary to track these individual watch instances, and to post the appropriate callback when one of the instances triggers. That is, each watch trigger to notify the client(s) is associated with one instance. Each Watch_Instance Structure 1900 contains a cookie needed by the notification callback to differentiate the instances, and a maximum buffer size, which is a hint from the N-module 310 that indicates how much data can be returned from the N-module to the client for a change notification (a triggered watch event). Notably, each instance 1900 may be deleted after the associated watch is triggered, or after a client specifically requests that the instance be cancelled.

In particular, Watch_Instance Structure 1900 comprises one or more fields used to carry/store associated information. Next_instance field 1905 contains a pointer to the next instance (1900) in a linked list of instances associated with an open (Watch_Open 1800), e.g., as in FIG. 16B. Watch_cookie field 1910 contains an opaque cookie passed when the Watch_Instance Structure 1900 is created, and is used as described herein. Request_preallocation_placeholder field 1915 contains a placeholder for request preallocation that may be used when deleting a directory being watched. In particular, in that case all instances have to notify clients of the pending delete before freeing the instances (described below). Also, Watch_max_buffer size field 1920 may be passed in the watch request, and contains the maximum number of bytes that can be sent back to the client for this watch (e.g., which if exceeded may return a "too_many" condition).

Figure 20:
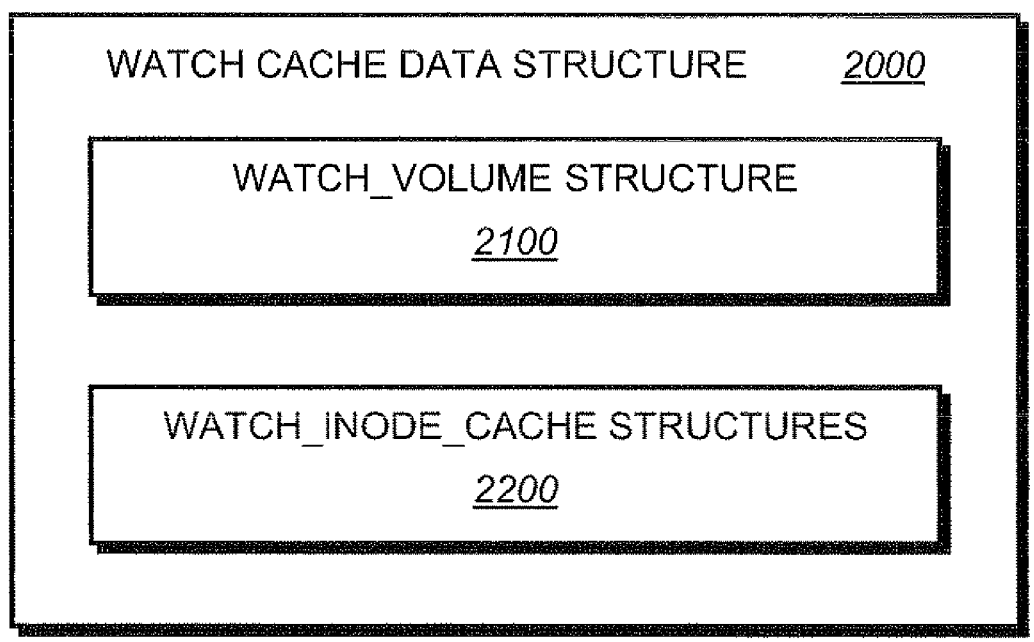
FIG. 20 is an illustrative block diagram of an example Watch Cache Data Structure in accordance with the present invention.

As noted, another type of data structure that may be used with the present invention is a Watch Cache Data Structure. FIG. 20 is an illustrative block diagram of an example Watch Cache Data Structure 2000 in accordance with the present invention. Watch Cache Data Structure 2000 may be used to cache watch information for individual file system objects to minimize processing when watches are checked or watch notifications are posted, as described herein. In particular, the Watch Cache Data Structure 2000 may have sub-structures comprising a Watch_Volume Structure 2100 and a Watch_Inode_Cache Structure 2200.

Figure 21:
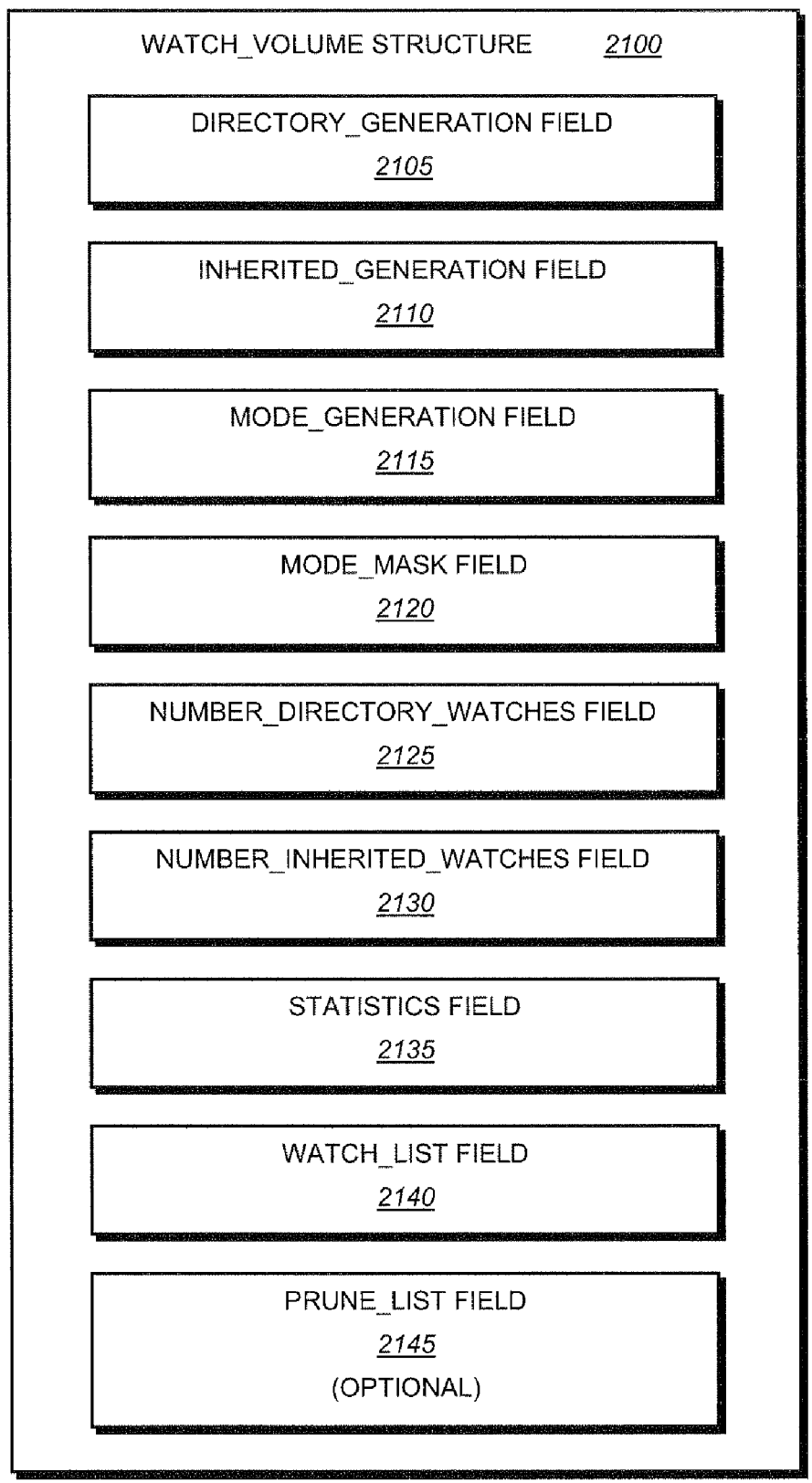
FIG. 21 is an illustrative block diagram of an example Watch_Volume Structure in accordance with the present invention.

FIG. 21 is an illustrative block diagram of an example Watch_Volume Structure 2100 in accordance with the present invention. Watch_Volume Structure 2100 contains a set of "generation numbers" that track changes to the watch hierarchy for a volume. By comparing these generation numbers with those contained in Watch_Inode_Cache Structure 2200 (below) attached to the inodes, a file operation can quickly tell the state of its cached watch information, and can limit the amount of processing required to check for triggers. Structure 2100 also contains watch version information, which may be used to determine the validity of inode watch caches, as well as a count and list of all watches and watched directories in the volume, to be used as described herein.

In particular, Watch_Volume Structure 2100 comprises one or more fields used to carry/store associated information. Directory_generation field 2105 contains a directory generation number which tracks additions of non-inherited watches to a volume (generation numbers are described in more detail below). Inherited_generation field 2110 contains an inherited generation number which tracks additions of inheritable watches to a volume. Mode_generation field 2115 contains a mode generation number, which tracks additions to the modes being watched for individual watches. Mode_mask field 2120 contains a lists supported inodes of the volume. Number_directory_watches field 2125 contains a count of the number of inheritable and non-inheritable watches on the volume. Number_inherited_watches field 2130 contains a count of the number of inheritable watches and directories on the volume. Statistics field 2135 contains a set of per-volume statistics. Watch_list field 2140 contains a list of all the Watch_Directory Structures 1700 associated with the volume. Lastly, Prune_list field 2145 (optional) contains a list of stale opens/watches; that is, for use with recycling Watch_Opens 1800 which have no Watch_Instances 1900 for a configured length of time (e.g., such as when a client doesn't renew a watch).

FIG. 22 is an illustrative block diagram of an example Watch_Inode_Cache Structure 2200 in accordance with the present invention. Illustratively, Watch_Inode_Cache Structure 2200 may be used to associate summary watch state with an inode. This information includes the same set of generation numbers tracked in the Watch_Volume Structure 2100, with the addition of a post generation number used to eliminate rapid duplicate watch posts. When there are watches present in the volume, one of these structures 2200 is computed and associated with an inode. The association may occur during an open operation, in which the Watch_Inode_Cache Structure 2200 is computed during path lookup. For all file operations, the cached information may be computed via an I2P walk during the operation's LOAD phase (described below). The cache structure 2200 may be destroyed when the in-core inode is recycled.

If the Watch_Inode_Cache Structure 2200 is present, it can be used to determine if the cache 2000 is valid, if a post is necessary, and if an I2P parent walk is necessary to locate possible watches. The Structure 2200 generally contains a watch mode summary that is the superset of all watches that is filtering for this object, a path to the most ancestral watch for the object, present only when a post has occurred for the object, and a matching set of generation numbers for those in the Watch_Volume Structure 2100, each of which is compared to determine the validity of various aspects of the Watch_Inode_Cache Structure information. Also, an additional post generation number is compared with a global post generation number kept in the Watch_Global structure 2600 to allow for the efficient suppression of rapid, duplicate posts.

In particular, Watch_Inode_Cache Structure 2200 comprises one or more fields used to carry/store associated information. Directory_generation field 2205 corresponds to Directory_generation field 2105 of Watch_Volume Structure 2100. Inherited_generation field 2210 corresponds to Inherited_generation field 2110 of Watch_Volume Structure 2100. Mode_generation field 2215 corresponds to Mode_generation field 2115 of Watch_Volume Structure 2100. Post_generation field 2220 corresponds to Post_generation field 2615 of Watch_Global Structure 2600 (below), and contains a post generation number, which is changed after every notification callback set is sent. Post_action_mask field 2225 contains a mask of all of the actions that have triggered for this inode during the current Post_generation period. (Notably, Post_action_mask 2225 may be used in conjunction with Post_generation field 2220 to suppress rapid, duplicate triggers.) Mode_summary field 2230 contains a summary of all of the applicable modes accumulated through the parent chain of this inode. Lastly, Path_pointer field 2235 contains a pointer to a path that is the complete path from this inode to the top most watch in the associated I2P chain (which may be empty).

Generation numbers, as mentioned above and as used to fill certain various fields described above, are a type of timing/count number that may be updated/changed (e.g., increased/incremented) upon certain defined actions. Generally, generation numbers may change in response to creating watches, handling watches, and handling notification callback messages. The four types of generation numbers mentioned above and used in accordance with one or more embodiments of the present invention are directory_generation, inherit_generation, mode_generation, and post_generation.

Directory_generation fields contain values (generation numbers) that are incremented ("bumped") whenever a new Watch_Directory 1700 is added to the volume. These signify that a new directory is being watched for the first time. The generation number is not incremented when a new watch (Watch_Open 1800) is added to a directory that already has watches present, or when a Watch_Directory Structure 1700 is removed.

A change to this value informs the file operation watch handling code that its summary mode may be incorrect, and should be recomputed. If only Directory_generation has changed, and Inherit_generation has not, existing caches with modes that were not inherited only need to check for parent node changes; that is, a complete I2P parent walk is not necessary.

Inherit_generation fields contain values that are incremented whenever a directory is watched, and the watch is inheritable, or when the first inheritable watch is added to an existing watched directory. The value is also incremented when a directory is renamed, since an associated inheritance has changed. The value is not incremented when a non-is directory (file) is renamed, nor when an inheritable watch is removed. If inode caches have Inherit_generation mismatches, then the inheritance structure has changed, and cached paths must be released, and I2P walks are necessary to find interested watchers.

Mode_generation fields contain values that are incremented whenever a new watch is added to an existing watched directory, and the new watch adds new trigger mode bits to the mode summary for the directory. This signifies that the inheritance structure has not changed, but that summary trigger mode values are no longer valid and should be recomputed. When an inode indicates that it has no watchers, mode_generation changes can be safely ignored.

Post_generation fields contain values that are incremented during notify callback processing. Along with the watch action value stored in the inode cache (Post_action_mask 2225), this value allows rapid, duplicate posts to be avoided, since each inode only needs to post the first instance of an action during a single notify callback cycle.

Figure 23:
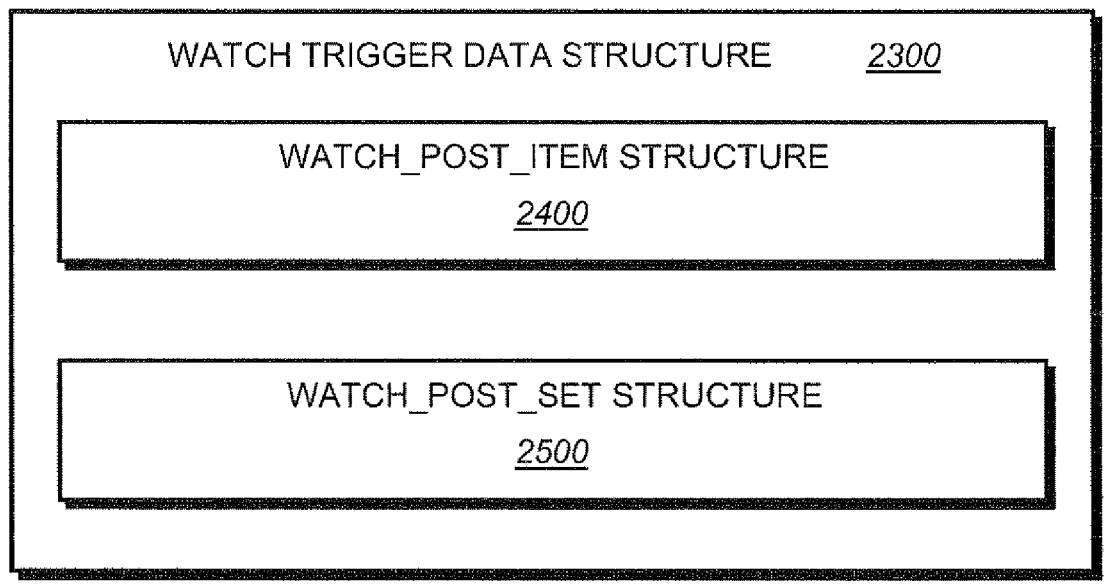
FIG. 23 is an illustrative block diagram of an example Watch Trigger Data Structure in accordance with the present invention.

Still another type of data structure that may be used with the present invention is a Watch Trigger Data Structure. FIG. 23 is an illustrative block diagram of an example Watch Trigger Data Structure 2300 in accordance with the present invention. Watch Trigger Data Structure 2000 may be created and populated when watch events are triggered (i.e., changes are made to watched data), thus triggering post operations, as described herein. In particular, the Watch Trigger Data Structure 2300 may have substructures comprising a Watch_Post_Item Structure 2400 and a Watch_Post_Set Structure 2500.

Illustratively, as described herein, notification callbacks (aka "posts") may be computed during the LOAD phase and committed during the MODIFY phase of appropriate file operation handlers. The watch process/mechanism 363 uses one or more Watch_Post_Item structures 2400, each of which represents a post, and a Watch_Post_Set structure 2500, which is a container for all of the posts generated for a single file operation. For example, the Watch Trigger Data Structure 2300 illustratively contains a list of actions to post (in Item Structures 2400), each post containing a watch-relative pathname and an action to be performed, and a summary mask for all of the post actions contained in the post set (in Set Structure 2500). During the MODIFY phase of file operations (described herein), Watch_Post_Set is walked, and paths are committed (allocated) and transferred from the Watch_Post_Item structures to slots in the appropriate Watch_Open Structures 1800.

Figure 24:
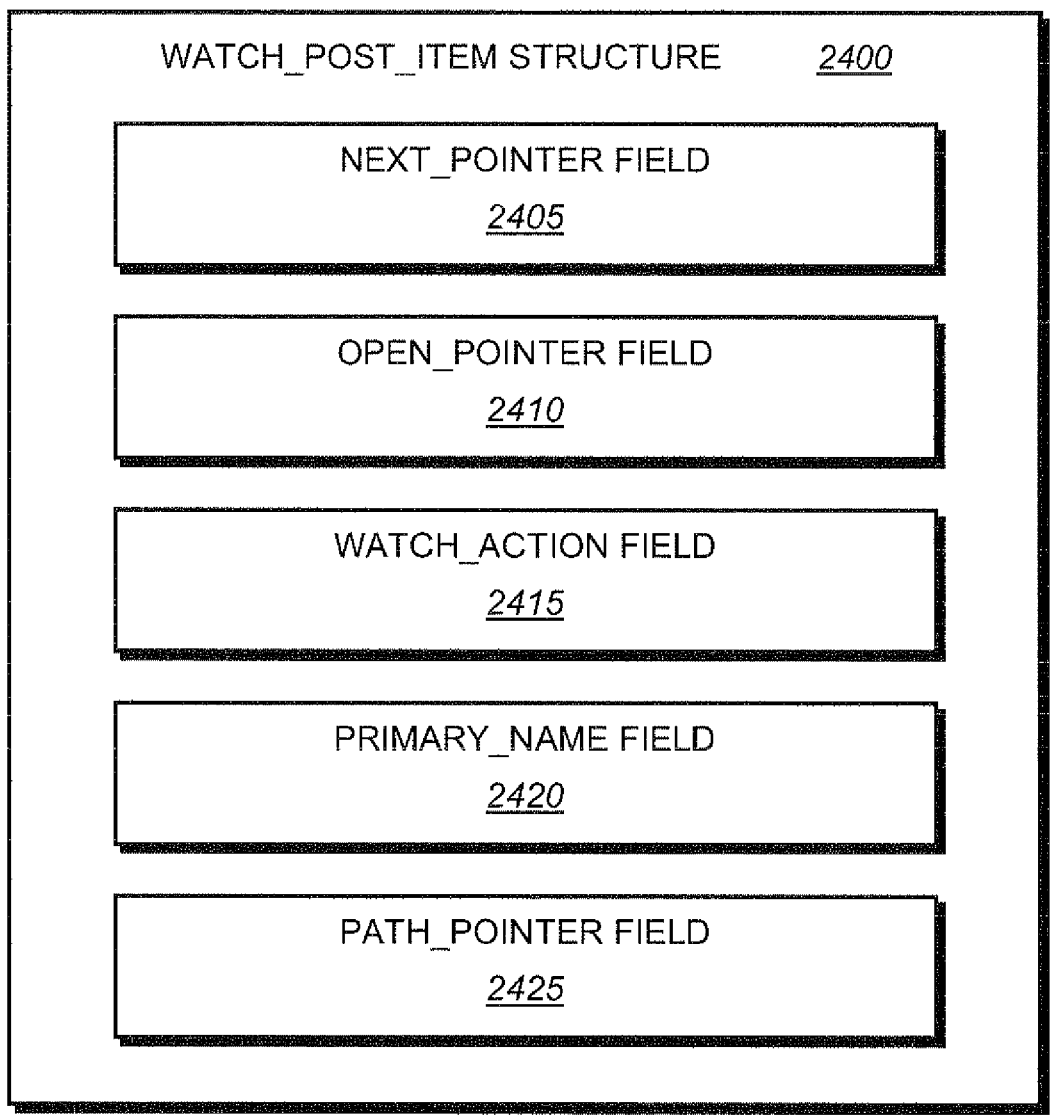
FIG. 24 is an illustrative block diagram of an example Watch_Post_Item Structure in accordance with the present invention.

FIG. 24 is an illustrative block diagram of an example Watch_Post_Item Structure 2400 in accordance with the present invention. Illustratively, each Watch_Post_Item Structure 2400 represents a single post item, and captures all information needed to post a callback. As noted, it is created during a LOAD phase of operations, and committed (allocated) with Watch_Open Structures 1800 during a MODIFY phase. Structures 2400 may contain the watch action associated with the post, and a watch relative path to be returned to the client in the form of a pathname. In addition, the primary name of the inode that is posting, which is used as a shortcut for path comparisons, may also be included within the Watch_ Post_Item Structure 2400.

In particular, Watch_Post_Item Structure 2400 comprises one or more fields used to carry/store associated information noted above. For instance, Next_pointer field 2405 contains a pointer to a next post item (2400) in a chain (e.g., empty if no further items exist). Open_pointer field 2410 contains a pointer to the Watch_Open Structure 1800 with which this post is associated. Watch_action field 2415 contains the action associated for this post item. Primary_name field 2420 contains information that corresponds to path_pointer 2425 (below), and may be used, along with Watch_action 2415, to uniquely identify post sources so that multiple posts may be collapsed, removed, etc. Path_pointer field 2425 contains a relative path from the watched directory that the open (Watch_Open 1800) is associated with to the object that posted the watch (e.g., which, if null, signifies an error).

Figure 25:
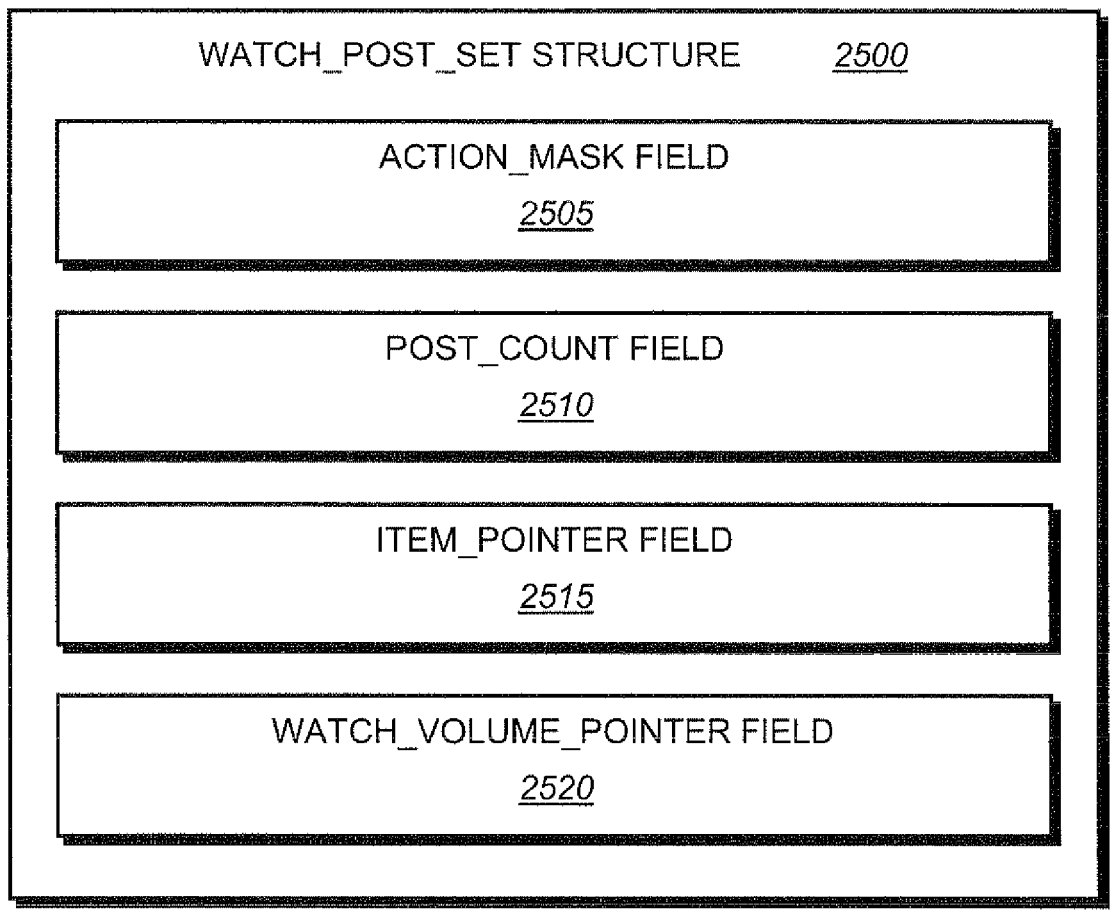
FIG. 25 is an illustrative block diagram of an example Watch_Post_Set Structure in accordance with the present invention.

Also, FIG. 25 is an illustrative block diagram of an example Watch_Post_Set Structure 2500 in accordance with the present invention. Illustratively, each Watch_Post_Set Structure 2500 is used to contain all of the Watch_Post_Item Structures 2400 that are processed by a file operation during its modify phase. In addition, Structure 2500 contains a "roll-up" of the post actions being signaled by the enclosed Post_Items 2400, which is used to update the Post_generation field 2220 of the associated Watch_Inode_Cache Structure 2200 during the modify phase. According to an illustrative embodiment, the Watch_Post_Set Structure 2500 may be allocated on a file operations stack, as may be appreciated by those skilled in the art.

Watch_Post_Set Structure 2500 comprises one or more fields used to carry/store associated information noted above. For instance, Action_mask field 2505 contains a rollup of all of the individual actions contained in the individual post items 2400. Post_count field 2510 contains a number of elements in Item_pointer field 2515, which contains a list of Watch_Post_Item Structures 2400 (e.g., terminated by "null"). Further, Watch_volume_pointer field 2520 contains a pointer to the volume to which this post set relates (which may be null), and that may be used for the case when renaming a directory and the Inheritance_generation needs to be incremented during the MODIFY phase.

Figure 26:
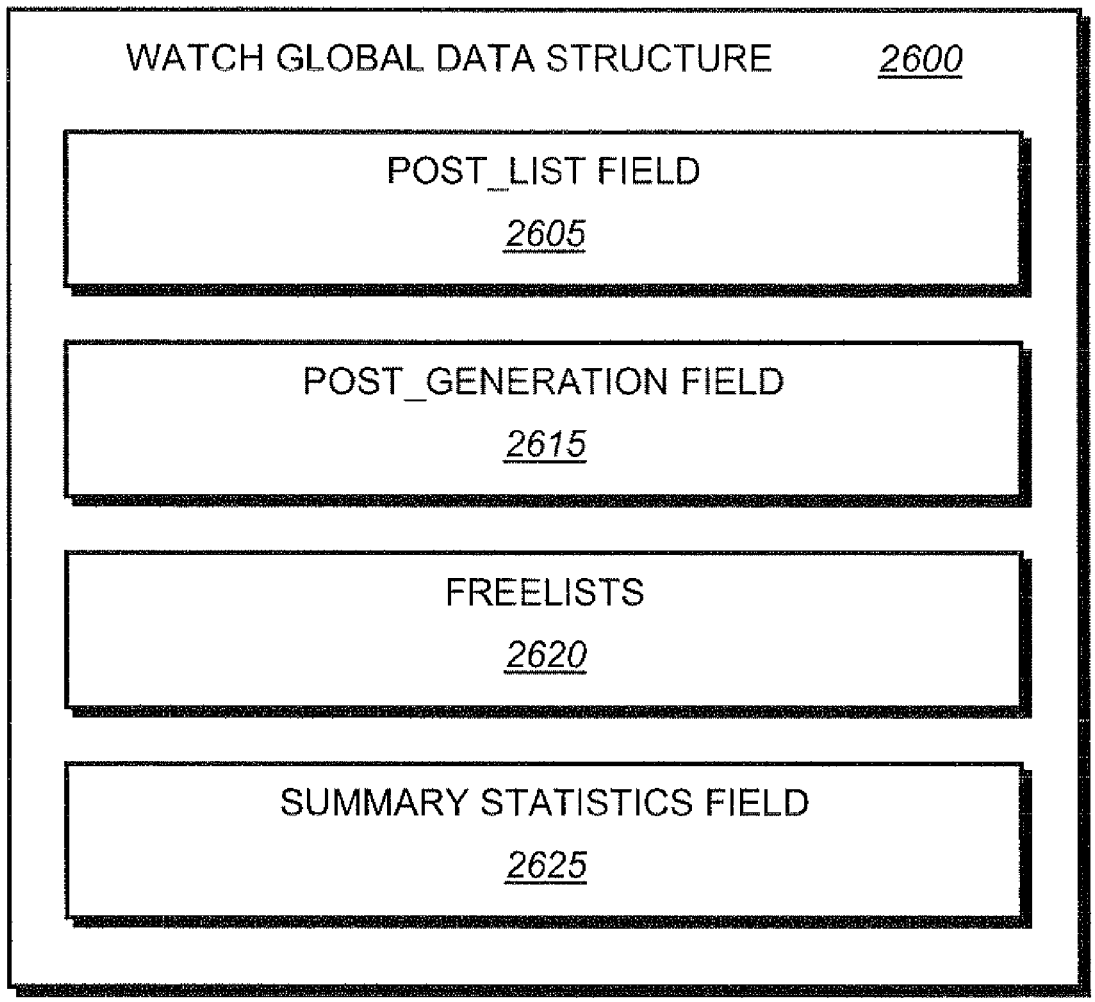
FIG. 26 is an illustrative block diagram of an example Watch Global Data Structure in accordance with the present invention.

The last noted type of (in-core) data structure that may be used with the present invention is a Watch Global Data Structure. FIG. 26 is an illustrative block diagram of an example Watch Global Data Structure 2600 in accordance with the present invention. Generally, there is one Watch Global Data Structure 2600 per D-module 350. In particular, Watch Global Data Structure 2600 comprises one or more fields used to carry/store associated information noted above. For instance, Structure 2600 may contain a global list of triggered watches in Post_list field 2610, which carries a list of Watch_Open Structures 1800 that have pending posts (notification callbacks) that remain in this list until processed. That is, Post_list 2610 contains a list of watches which have posts after their last callback. It is this post_list 2610 that is scanned in order to send notifies (callbacks). Further, as noted above, Post_generation field 2615 may contain values that are incremented after each notification callback processing cycle, used to eliminate rapidly repeated duplicate posts. Lastly, various freelists 2620 and other related data may be used for memory management, and summary statistics field 2625 may contain other global variables/statistics for the node (D-module) for watch operation processing (e.g., ASUP data as described below).

Watch Trigger Processing

In accordance with one or more embodiments of the present invention, the file system (e.g., watch process 363) may check for watch triggers during particular file operations. For instance, there are three situations when triggers are checked: when an object is created or linked, when an object is modified, and when an object is deleted or unlinked. For example, the following file operations have the associated watch processing:

CLOSE: watch for delete;
CREATE: watch for create and watch for modify;
LINK: watch for create;
OPEN: watch for create and watch for modify;
RENAME: watch for create and watch for delete;
SET_ATTRIBUTES: watch for modify;
WRITE: watch for modify;
REMOVE; watch for delete; and
UNLINK: watch for delete.

Each of the forms of watch checking (create/modify/delete) may follow the same basic algorithm, although each may have its own customization. For example, while checking watches for deletes, actions need not be kept in an inode cache (2200), since the object is being removed or its link count is being reduced. Illustratively, watches are triggered during a LOAD phase of file operations, which is where the operating system 300 reserves necessary resources for the operation to ensure success of the operation. Specifically, if a watch triggers, the appropriate post(s) are computed in the LOAD phase. These posts may then be committed in a MODIFY phase of the file operations, which is where those reserved resources from the LOAD phase are committed. In this manner, the posts are not committed unless the entire file operation is successful.

Figure 27:
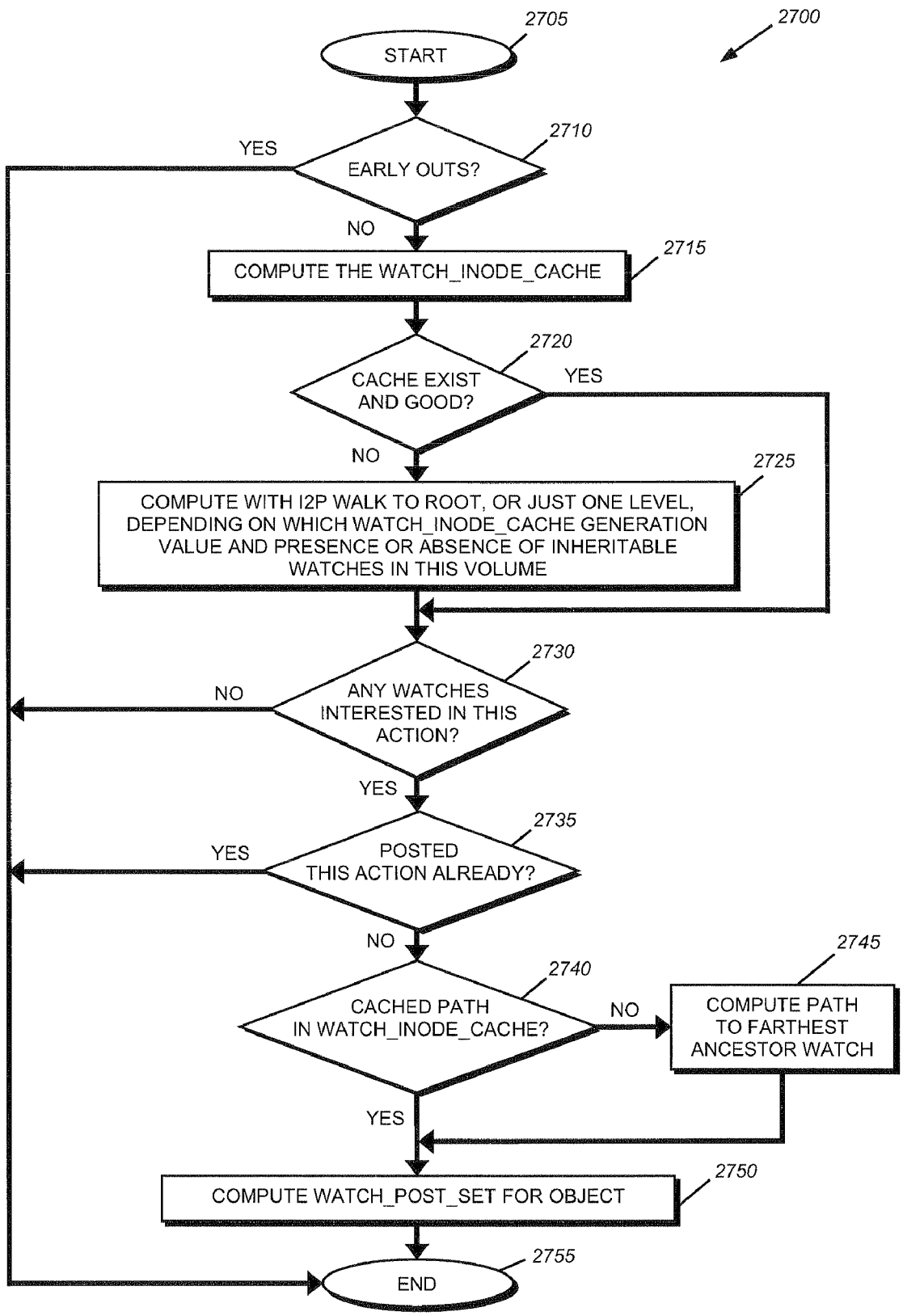
FIG. 27 is a flowchart detailing the steps of a procedure for use with supporting Change Notify watches during a LOAD phase of file operations in accordance with one or more embodiments of the present invention.
Figure 28:
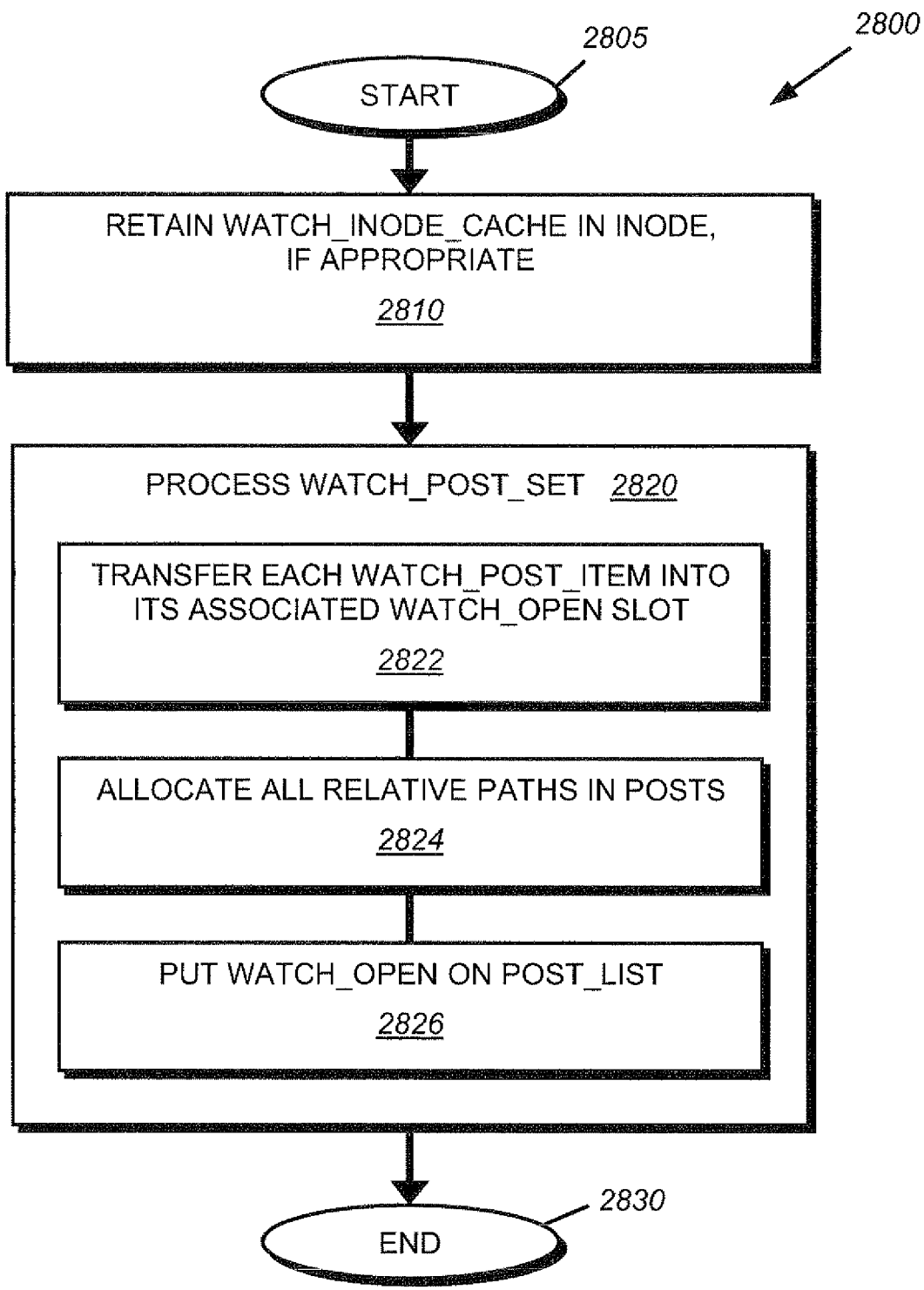
FIG. 28 is a flowchart detailing the steps of a procedure for use with supporting Change Notify watches during a MODIFY phase of file operations in accordance with one or more embodiments of the present invention.

FIGS. 27 and 28 illustrate an example watch checking algorithm in accordance with the present invention. In particular, FIG. 27 is a flowchart detailing the steps of a procedure 2700 for use with supporting Change Notify watches during a LOAD phase of file operations in accordance with one or more embodiments of the present invention. The procedure 2700 begins in step 2705 with a file object and continues to step 2710 where the system (watch process 363) checks for simple "early outs", such as by determining that no watches are present for any object on the volume. If there are early outs, the procedure 2700 ends in step 2755. If, on the other hand, there are no simple early outs, the Watch_Inode_Cache 2200 is computed for the object in step 2715. (Note that step 2715 may be optimized for file OPEN operations by computing the cache 2200 during path lookup in the OPEN operation, as may be appreciated by those skilled in the art.) If the cache does not already exist or is not good (i.e., not valid) in step 2720, then the system performs an I2P walk to compute the cache. That is, an I2P walk may be performed to the root, or just one level, depending on the Watch_Inode_Cache generation numbers and whether inheritable watches are present in the volume, as described above.

It step 2730, a determination is made as to whether the Watch_Inode_Cache 2200 shows that no watches are interested in this action. If there are no interested watches, an early out causes the procedure 2700 to end in step 2755. If, however, there is at least one interested watch in step 2730, the system may then determine in step 2735 whether this action has been posted for this object during this post generation cycle, as described herein. If so, an early out condition causes the procedure to end in step 2755, but if not, the action needs to be posted. As such, if there is no cached path in Watch_Inode_Cache 2200 in step 2740, then the path may be computed to the farthest ancestor watch in step 2745, e.g., using I2P walk with directory loads. Once the path is cached, Watch_Post_Set 2500 is computed for the object (e.g., through an I2P walk), and the procedure 2700 for the LOAD phase of a file operation ends in step 2755.

FIG. 28 is a flowchart detailing the steps of a procedure 2800 for use with supporting Change Notify watches during a MODIFY phase of file operations in accordance with one or more embodiments of the present invention. The procedure 2800 begins in step 2805 (e.g., after the LOAD phase on the file object) and continues to step 2810 where the Watch_Inode_Cache 2200 is retained in the inode, if appropriate. For example, cache 2200 may include the path as computed in step 2745 of the LOAD phase procedure 2700 above. In step 2820, the Watch_Post_Set 2500 is processed. For instance, in sub-step 2822 each Watch_Post_Item 2400 may be transferred into its associated Watch_Open 1800 slot (1850), and in sub-step 2824, all relative paths are allocated in the posts. Also, in sub-step 2826, the Watch_Open is put on the Post_list 2610, and the procedure 2800 for the MODIFY phase of the file operation ends in step 2830. Notably, as mentioned above, variations from the above procedures 2700 and 2800 may be present with regard to optimizations for different file operations and forms of watch checking, and such variations are within the scope of the present invention. For example, inode caching support need not be returned for REMOVE file operations, since caching is not necessary. Also, RENAME file operations may result in more primitive calls, since RENAME may result in several posts for each watch in the watch chain (i.e., a creation, and one or more deletions). It may also be desirable to collapse all of such RENAME posts into a single post set.

Note again that I2P/ancestor walking (traversing I2P mappings), as described in detail above, may be used by watch process 363 to obtain the relative pathname of a file or directory by walking (e.g., bottom-up) through the file's or directory's ancestor chain. In other words, with the information stored in the inodes, walking backwards up the file-system tree from the filename to its ancestors is allowed, thus enable watch lookup and notification callback pathname construction, as described herein. In particular, the I2P walking is necessary to create or update an object's Watch_Inode_Cache Structure 2200, compute an object's path (pathname) for posting, and compute the Watch_Post_Set 2500 for an object, as described herein.

As an example, assume that a path exists from a root of the file system to an object "x", and the full path (pathname) is "/a/b/c/x", as will be appreciated by those skilled in the art. In the event that an inherited watch is set on directory "b", when object "x" is modified (changed), an I2P walk is performed from "x" to "a" to discover that there is a watch at "b" that is interested in the change. Once the interested watch is located, another I2P walk may be performed to construct a relative pathname from "b" to "x" (e.g., after an intermediate I2P walk to determine the distance from the changed object to the watched directory, accordingly), thus resulting in relative pathname "c/x" that may be sent to the clients accordingly. These multiple I2P walks are necessary due to the fact that there may be multiple watches set up and down the path, so the watches (and distances) can be determined prior to constructing the pathname. As such, the caching techniques described herein may be advantageously utilized to reduce the number of I2P walks necessary during watch trigger processing. In accordance with one or more embodiments described herein, a notification callback (e.g., "NOTIFY_CB") operation may be sent to inform N-modules 310 of watch posts (e.g., the pathnames) generated at D-modules 350 (e.g., within a CF Message 400). The N-module (i.e., the device setting the watch, watch process 323), in turn, may send notifications of these events (e.g., the path-names) to the proper CIFS (e.g., Windows) client identified by the Watch_cookie 1910 (of Watch_Instance 1900) given to the client as part of the callback. Illustratively, a file system backdoor message (or other dedicated thread and/or timeout mechanism) may be used to trigger periodic generation of notification callback messages, such as at a timeout interval, e.g., one second. Clients may respond to the callback messages with requests to renew or cancel the associated watch (where renewing a watch maintains a current Watch_Open 1800 intact, not adding another Watch_Instance 1900).

Notably, watches for volumes that are "offlined" or "unmounted" may illustratively maintain their state (as with the locks), such that upon returning ("onlined" or "remounted"), the watches remain active. In this manner, watches may only be closed in response to a specific request from the client or if the corresponding file (or, illustratively, the corresponding lock) is deleted. Further, in the event of a "sendhome", as will be appreciated by those skilled in the art, locks and watches may be destroyed on the source node.

When a watch is destroyed, any pending notification callbacks are consequently aborted/ceased. Further, if a directory being watched by one client is deleted by another client, all existing watches on that directory are posted by D-module 350 with a watch action "DELETE_PENDING", which indicates that the directory (or file within the directory) is about to be deleted by another client. This indication prompts the corresponding N-module 310 to respond to the appropriate CIFS (Windows) clients with DELETE_PENDING, as expected by the CIFS Change Notify features, as will be understood by those skilled in the art. Notably, as an added optimization, if a directory is marked as deleted by the system 300, but is still waiting on the last client to close the directory (e.g., DELETE_ON_CLOSE semantics of the CIFS protocol for DELETE_PENDING), any attempt made by clients to set watches on this deleted directory may be replied to with a DELETE_PENDING notification, without setting the watch on the deleted directory.

In addition, in accordance with one or more embodiments of the present invention, various support or "auto support" (ASUP) measurements (e.g., on per volume and per-node basis) may be kept with regard to the watch support. For instance, the following statistics, inter alia, may be kept (e.g., in global statistics field 2625 and/or volume statistics field 2135): the number of times an inode watch cache was valid and reused ("cache hits"), the number of times an inode watch cache was updated, but not allocated ("cache updates"), the number of times an inode watch cache was created ("cache creates"), the number of times watch I2P walks to the root of the volume were performed ("I2P root walks"), the number of times single level watch I2P walks were performed (not to root of volume) ("I2P single level walks"), the number of I2P walks to compute watch paths that cause the directories to be loaded ("I2P path walks"), the number of times cached paths were good ("I2P path cache hits"), the average path lengths of watch paths (e.g., in elements not bytes) ("I2P path length average"), the number of times watch post processing was averted because of cache hits ("post cache hits"), the number of I2P walks to compute watch posts ("post walks"), the number of watch posts ("watch posts"), the number of directories that are being watched ("watched directories"), etc.

Watch Support for Volume Moves

Volumes are often moved between nodes of a cluster, and the expectation is that the move is completely transparent to clients, i.e., no outage to file access or loss of state. Because watches represent a Change Notify state, the watches (and associated information) also need to be moved. As such, according to another aspect of the present invention, if the logical volumes are moved from a first storage device (e.g., serviced by a first D-module 310 of a clustered storage system) to a second storage device (e.g., serviced by a second D-module 310), the watches are retained during the move to the second storage device.

In particular, as noted herein, watches are closely paired with locks. As such, a new operation may be defined in accordance with the present invention to identify the presence of watch information along with the lock information to reproduce watch state on the destination of volume move. For example, a new flag may be set within a lock transfer command to indicate that the lock has associated watches. (Note that this may allow for backward compatibility with systems not supporting watches.)

Figure 29:
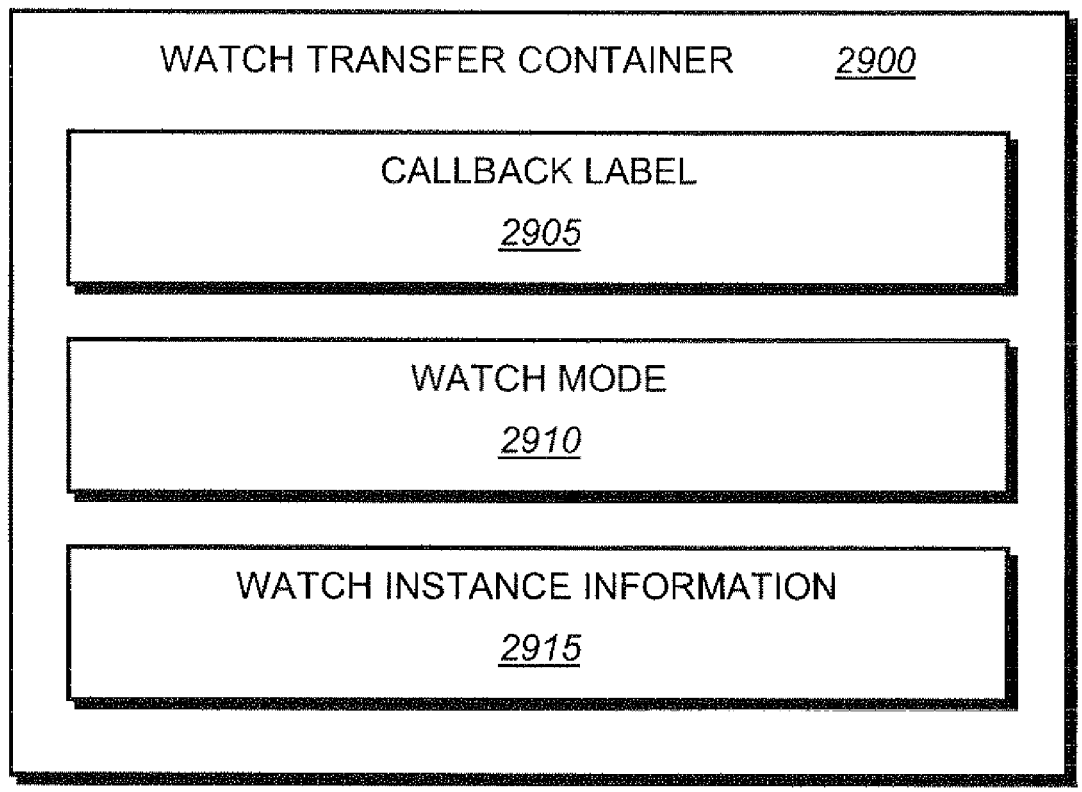
FIG. 29 is an illustrative block diagram of an example watch transfer container that may be used to encapsulate watch information along with lock information in accordance with the present invention.

FIG. 29 is an illustrative block diagram of an example watch transfer container 2900 that may be used to encapsulate watch information along with lock information in accordance with the present invention. In particular, the container 2900 transfers a callback label 2905 (which may identify whether an associated lock conforms to the CIFS or NFS protocol), watch mode 2910, and watch instance information 2915 (e.g., max buffer size, cookies, etc.) for each Watch_Open 1800 and Watch_Instance 1900 in the source volume (i.e., fields 2910 and 2915 carry the watch state that is being transferred to the new volume). Illustratively, the container 2900 may be encapsulated within an existing data structure used to carry lock information during a volume move, or may be a stand-alone container, if supported by the systems participating in the volume move.

Figure 30:
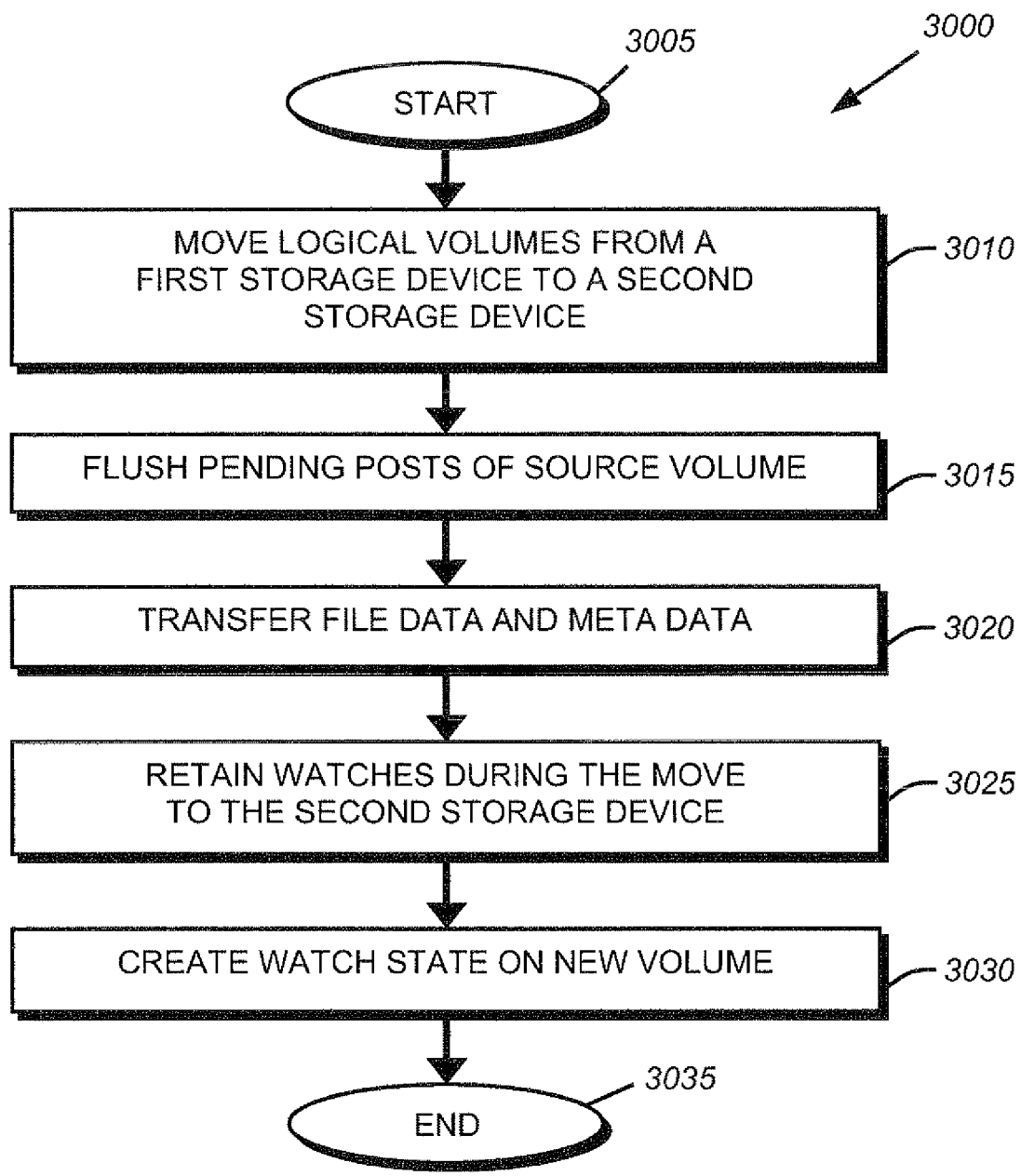
FIG. 30 is a flowchart detailing the steps of a procedure for use with supporting watches during volume moves in accordance with one or more embodiments of the present invention.

FIG. 30 is a flowchart detailing the steps of a procedure 3000 for use with supporting watches during volume moves in accordance with one or more embodiments of the present invention. The procedure 3000 starts in step 3005 and continues to step 3010 where logical volumes are moved from a first storage device (e.g., serviced by a first D-module 350) to a second storage device (e.g., serviced by a second D-module 350). During step 3010, external client traffic to a first/source volume may be blocked by "quiescing" the volume (e.g., declaring the volume inactive during the move). Pending posts (Global Post_list 2610) may then be flushed in step 3015 prior to allowing the volume move, and as such, need not be transferred to the new volume. Note that the volume move need not wait for a response to the notification callback messages for the flushed posts, according to an illustrative embodiment herein. In step 3020, all appropriate file data and meta data may be transferred from the first/source volume to the second/destination volume. In step 3025, watches may be retained during the move to the second storage device in a manner as described in detail above, such as using container 2900 as an addition to lock transfers between the volumes to marshal (organize) the watch information. (Notably, in the event that watch moves are not supported (e.g., container 2900 is not understood between volumes, such as due to different versions of an operating system 300), then watches may not be transferred, and the clients may be forced to re-set any desired watches on the new volume.) In step 3030, the second/destination volume may unmarshal the watches (retrieve the organized watches) and accordingly create watch state on the new volume (e.g., along with each watch's respective lock state). The procedure 3000 ends in step 3035 with watches moved to the second volume, accordingly. In this manner, the watch state from the first/source volume is recreated on the second/destination volume, and the first volume's watch state may be cleaned over time (e.g., during its destroy path).

Note that for local volume moves (i.e., volume moves within control of a same D-module 350), watches need not be recreated. Instead, the watches may remain attached to their Watch_Directory 1700 (and associated locks), and the volume_pointer 1725 in the Watch_Directory 1700 is reassigned, and watch counters (generation numbers) from the old volume are copied to the new volume. Since there are no outstanding posts at this point (i.e., have been flushed), the Global Post_list 2610 is empty on the source volume. The new volume watch information, including the generation numbers and counters are reinitialized, so that all inode caches are invalidated and will trigger a "slow-path" approach during posting (that is, does not have the benefits of the caching, as described above).

In summary, the present invention advantageously overcomes the disadvantages of the prior art by providing a system and method for supporting Change Notify watches in virtualized storage systems. In particular, techniques of the present invention emulate Change Notify features (e.g., as documented by the CIFS protocol) on virtualized storage systems by leveraging virtualization mapping information (e.g., an inode-to-path or "I2P" mapping) to walk a file system tree backwards from the data blocks to their ancestors to obtain a pathname of the watched data. Also, performance may be enhanced using various caching techniques, and watch state may be retained while moving watched data across volumes of the virtualized storage system.

Figure 31:
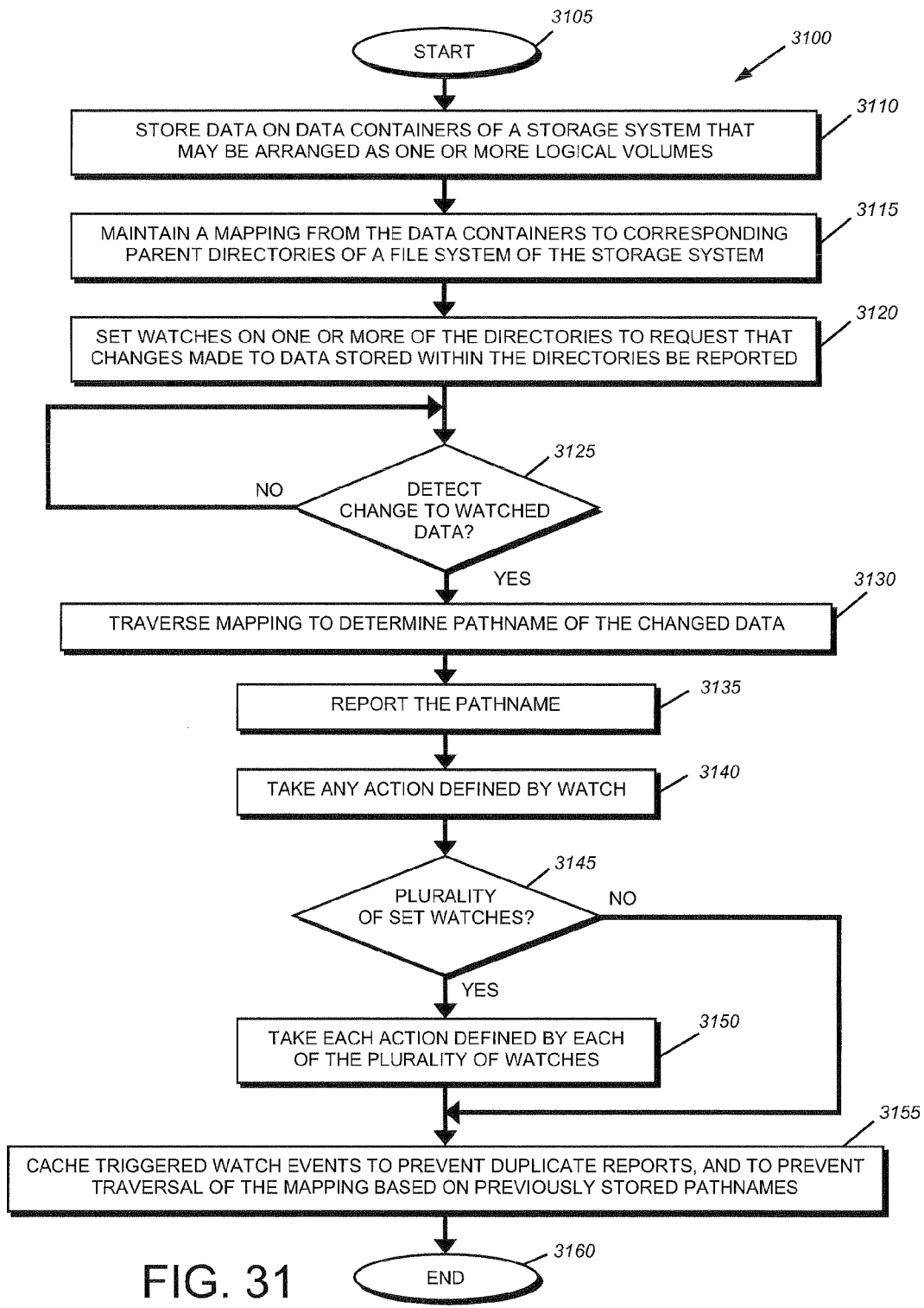
FIG. 31 is a flowchart illustrating the steps of a procedure for use with supporting Change Notify watches in virtualized storage systems in accordance with one or more embodiments of the present invention.

FIG. 31 is a flowchart illustrating the steps of a procedure 3100 for use with supporting Change Notify watches in virtualized storage systems in accordance with one or more embodiments of the present invention. The procedure 3100, whose specific are described in more detail above, starts in step 3105 and continues to step 3110 where data is stored on data containers of a storage system that may be arranged as one or more logical volumes, e.g., as described above. Also in step 3115, mapping (e.g., I2P mapping) from the data containers to corresponding parent directories of a file system of the storage system may be maintained. In step 3120, watches may be set on one or more of the directories to request that changes made to data stored within the directories be reported. In response to a detected change to watched data in step 3125, the system traverses the mapping in step 3130 to determine the pathname of the changed data, and in step 3135, reports the pathname (e.g., D-module 350 reports the pathname to a corresponding N-module 310). Notably, as described above, step 3125 may illustratively imply (e.g., for data without its own watch) that in response to changes to any data, the mapping is traversed determine whether there are applicable watches on ancestor directories of the changed data, thus detecting a change to "watched" data, accordingly.

If the watch defines an action, that action may be taken in step 3140. Also, if there are a plurality of set watches on the changed data in step 3145, then each action defined by each of the plurality of watches may be taken in step 3150 (e.g., as described above, multiple posts/callbacks). In step 3155, however, triggered watch events may be cached to prevent duplicate reports, and to prevent traversal of the mapping based on previously stored pathnames. The procedure 3100 ends in step 3160.

While there have been shown and described illustrative embodiments that supporting Change Notify watches in virtualized storage systems, it is to be understood that various other adaptations and modifications may be made within the spirit and scope of the present invention. For example, the embodiments have been shown and described herein in conformance with CIFS and associated Change Notify features/functionality. However, the embodiments of the invention in its broader sense are not so limited, and may, in fact, be used with the Network File System (NFS) protocol. Further, while volumes are illustratively organized using inodes, the techniques described herein may be equally applicable to any type of volume organization, and the volume need not comprise an inode tree structure.

In addition, certain storage system vendors have implemented various forms of I2P mapping functionality. For example, the Novell NetWare system stores character strings of all of the names associated with an inode within the inode itself. However, inodes are typically fixed sized data structures and if a sufficient number of names are associated with an inode, additional "spill over" inodes must be allocated for the data container. Such a solution increases the complexity of managing data and utilizes extra and valuable inode numbers, which may be limited within the file system. Alternately, the Solaris operating system, available from Sun Microsystems, Inc., stores a pathname in the in-memory vnode data structure. However, modifications to the names of any directories in the pathname are not updated in the cached path within the vnode. Should a directory be renamed, the cached pathname data within the vnode data structure is not updated, which can result in incorrect pathnames being presented to an administrator. Another noted disadvantage is that no pathname information is stored persistently. Accordingly, while the inode tree structure and I2P mapping techniques described above are merely one representative example of mapping that may be used with the present invention, it may be appreciated by those skilled in the art that other, albeit possibly less efficient, mapping techniques may also be used in conjunction with the present invention.

The foregoing description has been directed to particular embodiments of this invention. It will be apparent, however, that other variations and modifications may be made to the described embodiments, with the attainment of some or all of their advantages. Specifically, it should be noted that the principles of the present invention may be implemented in non-distributed file systems. Furthermore, while this description has been written in terms of N and D-modules, the teachings of the present invention are equally suitable to systems where the functionality of the N and D-modules are implemented in a single system. Alternately, the functions of the N and D-modules may be distributed among any number of separate systems, wherein each system performs one or more of the functions. Additionally, the procedures, processes and/or modules described herein may be implemented in hardware, software, embodied as a computer-readable medium having program instructions, firmware, or a combination thereof. Therefore, it is the object of the appended claims to cover all such variations and modifications as come within the true spirit and scope of the invention.

What is claimed is:

1. A method, comprising:
    storing data on data containers of a virtual storage system, having data structures arranged as files and directories on one or more logical volumes of the virtual storage system;
    maintaining a mapping from the data to corresponding parent directories of the storage system;
    setting one or more watches on one or more of the directories, the watches requesting that changes made to data stored within the one or more directories be reported;
    detecting, by a processor, a change made to data stored within one directory of the one or more directories upon which a watch is set;
    in response to detecting the change made to data stored within the one directory upon which the watch was set, traversing the mapping to determine a pathname of the changed data based on the corresponding parent directories; and
    reporting the pathname of the changed data.

2. The method as in claim 1, wherein the watches define an action to be taken in response to changes made to data stored within the one or more directories, the method further comprising:
    taking the action defined by the watch in response to changes made to the data.

3. The method as in claim 1, wherein the mapping is an inode to path (I2P) mapping.

4. The method as in claim 1, further comprising:
    assigning locks to the data; and
    associating the watches with the locks.

5. The method as in claim 1, wherein the watches define an action to be taken in response to changes made to data stored within the one or more directories, the method further comprising:
    setting a plurality of watches on a single directory; and
    taking each action defined by each of the plurality of watches in response to changes made to the data.

6. The method as in claim 1, wherein the watches correspond to a Change Notify feature of a Common Internet File System (CIFS) protocol.

7. The method as in claim 1, wherein detecting a change made to data stored within the directory upon which a watch is set further comprises:
triggering the watches during a LOAD file operation for the data; and
committing the watches during a MODIFY file operation to the data.

8. The method as in claim 1, wherein reporting further comprises:
sending a notification callback message to a device setting the watch.

9. The method as in claim 1, further comprising:
setting inherited watches on data hierarchically below a directory upon which a watch is set; and
traversing the mapping to determine whether there are applicable watches on directories hierarchically above the changed data.

10. The method as in claim 1, further comprising:
caching triggered watch events.

11. The method as in claim 10, further comprising:
preventing duplicate reports based on the cached triggered watch events.

12. The method as in claim 10, further comprising:
storing pathnames for the triggered events; and
preventing traversal of the mapping based on the stored pathnames.

13. The method as in claim 1, further comprising:
moving the logical volumes from a first storage device to a second storage device; and
retaining the watches during the move to the second storage device.

14. A storage system, comprising:
one or more processors;
a file system configured to organize information stored on one or more logical volumes of the storage system as a hierarchical structure of data containers including directories and files upon which data is stored;
a maintained mapping from the data to corresponding parent directories of the file system; and
a memory configured to store a watch process, the watch process when executed operable to: set one or more watches on one or more of the directories, each watch to request that changes made to data stored within the one or more directories be reported, detect a change made to data stored within a directory of the one or more directories upon which a watch is set, in response to a detected change to data stored within the directory upon which a watch is set, traverse the mapping to determine a pathname of the changed data based on the corresponding parent directories, and report the pathname of the changed data.

15. The storage system as in claim 14, further comprising:
one or more storage elements configured to interface with one or more storage devices that store the data;
one or more network elements configured to interface with clients of the storage system; and
a cluster interconnect configured to interface the storage elements with the network elements.

16. The storage system as in claim 15, wherein a watch process of the storage elements is configured to report the pathnames to the network elements; and wherein a watch process of the network element is configured to report the pathnames to clients of the storage system.

17. The storage system as in claim 15, wherein the logical volumes are moved from a first storage element to a second storage element; the watch process further operable to: retain the watches during the move to the second storage.

18. The storage system as in claim 14, wherein the file system communicates according to a Common Internet File System (CIFS) and the watches correspond to a Change Notify feature.

19. A computer-readable medium containing executable program instructions executed by a processor, comprising:
program instructions that store data on storage devices of a storage system, the storage devices arranged as files and directories on one or more logical volumes of the storage system;
program instructions that maintain a mapping from the data to corresponding parent directories of a file system of the storage system;
program instructions that set one or more watches on one or more of the directories, the watches requesting that changes made to data stored within the one or more directories be reported;
program instructions that detect a change made to data stored within a one directory of the one or more directories upon which a watch is set;
program instructions that traverse the mapping to determine a pathname of the changed data based on the corresponding parent directories in response to the detected change made to the data stored within the one directory upon which the watch is set; and
program instructions that report the pathname of the changed data.

20. The computer-readable medium as in claim 19, further comprising:
program instructions that move the logical volumes from a first storage device to a second storage device; and
program instructions that retain the watches during the move to the second storage device.

21. A method, comprising:
storing data on data containers of a storage system, having data structures arranged as files and directories on one or more logical volumes of the storage system;
maintaining a mapping from the data to corresponding parent directories of a file system of the storage system;
setting one or more watches on one or more of the directories, the watches requesting that changes made to data stored within the one or more directories be reported;
detecting, by a processor, a change made to data stored within one directory upon which a watch is set, wherein detecting the change comprises triggering the watch during a LOAD file operation for the data and committing the watch during a MODIFY file operation to the data;
in response to detecting the change made to data stored within the one directory upon which the watch is set, traversing the mapping to determine a pathname of the changed data based on the corresponding parent directories; and
reporting the pathname of the changed data.

* * * * *

UNITED STATES PATENT AND TRADEMARK OFFICE
CERTIFICATE OF CORRECTION

PATENT NO. : 7,809,776 B1
APPLICATION NO. : 11/948608
DATED : October 5, 2010
INVENTOR(S) : Witte et al.

It is certified that error appears in the above-identified patent and that said Letters Patent is hereby corrected as shown below:

PLEASE CORRECT AS FOLLOWS:

Col. 3, line 17:
better understood by ~~referis ring~~ referring to the following description Col. 6, line 18:
one or more management processes that execute as user ~~inode~~ mode Col. 8, line 59:
~~minoring~~ mirroring and/or parity (RAID). The file system 360 illustra- Col. 14, line 20:
parent indirect block (e.g., ~~Mode~~ inode or indirect block). On a read Col. 14, lines 23-24:
blocks, each of which, in turn, points to an ~~Mode~~ inode file and its
corresponding ~~Mode~~ inode buffer tree. The read path on a flexible Col. 14, line 38:
blocks, ~~Mode~~ inode file level 0 (L0) blocks. FIG. 8 is a schematic Col. 14, lines 41-42:
present invention. A root (top-level) ~~Mode~~ inode 802, such as an
embedded ~~Mode~~ inode, references indirect (e.g., level 1) blocks Col. 14, line 45:
directory. The indirect blocks (and ~~Mode~~ inode) contain pvbn/vvbn Signed and Sealed this
Thirty-first Day of January, 2012

David J. Kappos
*Director of the United States Patent and Trademark Office*

CERTIFICATE OF CORRECTION (continued)
U.S. Pat. No. 7,809,776 B1

Col. 16, line 50:
    tion of management processes that execute as user ~~inode~~ mode Col. 25, line 30:
    field 2120 contains a lists supported ~~inodes~~ modes of the volume.

Col 36, line 25:
    stored within ~~a~~ one directory of the one or more direc-